(12) United States Patent
Picone et al.

(10) Patent No.: US 6,826,480 B2
(45) Date of Patent: Nov. 30, 2004

(54) SIMILARITY TRANSFORMATION METHOD FOR DATA PROCESSING AND VISUALIZATION

(75) Inventors: J. Michael Picone, Falls Church, VA (US); Robert R. Meier, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/253,654

(22) Filed: Sep. 25, 2002

(65) Prior Publication Data

US 2003/0033125 A1 Feb. 13, 2003

Related U.S. Application Data

(62) Division of application No. 09/893,015, filed on Jun. 28, 2001, now Pat. No. 6,714,868.

(51) Int. Cl.[7] .......................... G06F 19/00; G06F 7/60
(52) U.S. Cl. .......................................... 702/3; 703/2
(58) Field of Search ................... 702/3, 2, 24; 703/2; 701/103

(56) References Cited

U.S. PATENT DOCUMENTS

| | | | | |
|---|---|---|---|---|
| 5,324,113 A | * | 6/1994 | Ingram et al. | 374/124 |
| 5,428,358 A | * | 6/1995 | Gardner | 342/26 |
| 6,477,468 B1 | * | 11/2002 | Dahlke | 702/3 |
| 6,484,099 B1 | * | 11/2002 | Holzer-Popp et al. | 702/2 |

OTHER PUBLICATIONS

"Calculation of the Ionospheric O Concentration from O II 834 Angstrom Airglow Using Discrete Inverse Theory", Picone et al., Naval Research Laboratory, Sep. 1, 1995.*
"A Prototype Upper–Atmosphere Data Assimilation Scheme Based on Optimal Interpolation: 1. Theory", Akmaev, Journal of Atmospheric and Solar–Terrestrial Physics 61, 1999, pp. 491–504.*
"A Prototype Upper–Atmosphere Data Assimilation Scheme Based on Optimal Interpolation: 2. Numerical Experiments", Akmaev, Journal of Atmospheric and Solar–Terrestrial Physics 61, 1999, pp. 505–517.*

* cited by examiner

Primary Examiner—John Barlow
Assistant Examiner—Toan M. Le
(74) Attorney, Agent, or Firm—John J. Karasek; John Gladstone Mills, III

(57) ABSTRACT

A similarity transform method of providing parameterized representation of physical or engineering functions for use in retrieving the engineering or physical functions from data, comprising (a) obtaining samples of the functions from data, numerical simulations, or analytic models, (b) extracting generic function shape information from the samples, (c) embedding the function shape information in a parametric discrete grid-based function representation model (forward model); (d) fitting data with the forward model; and (e) retrieving the function from the fitted forward model. The similarity transform method provides a framework for extracting generic function shape information, in the form of non-dimensional shape function, from data, numerical simulations, or analytic model. Thus, the present invention facilitates analysis of general characteristics of a physical or engineering variable, in terms of the dependence of the variable on other variables or parameters.

20 Claims, 16 Drawing Sheets

SIMILARITY TRANSFORMATION METHOD FOR DATA PROCESSING AND VISUALIZATION

This application is a divisional of Ser. No. 09/893,015 filed on Jun. 28, 2001 now U.S. Pat. No. 6,714,868.

FIELD OF THE INVENTION

The present invention relates to data processing and visualization. More particularly, it relates to a similarity transformation method of representing physical or computer generated data or functions on a discrete grid of one or more independent coordinates for use in a variety of computer applications. In this regard, this method extracts generic shape information on functions of one or more variables, and provides the means to manipulate a function describing a physical system while maintaining the generic shape of the function for a variety of computer applications, such as, for example, function fitting, inversion of data, graphical display and data visualization, pattern recognition, and data synthesis.

BACKGROUND AND SUMMARY OF THE INVENTION

Applications that extract generic shape information involve the construction of a parametric representation of the data or object of interest, and then manipulating the values of the parameters to cover the range of states that may be realized by the physical or graphical system of interest.

For example, upper atmospheric remote sensing techniques often measure geophysical properties indirectly, requiring that the underlying variable of interest (e.g., species density) be inferred from the data through comparison with a forward model of measurement process. In discrete inverse theory (DIT), the forward model includes a parametric representation of the variable to be retrieved. The data then provides a basis for computing optimal values of the model parameters.

Consider the remote measurement of altitude profiles of upper atmospheric properties (e.g., species densities or temperatures). Measurement techniques include computerized ionospheric tomography and remote sensing of thermospheric and ionospheric composition using ultraviolet limb-scanning or limb-imaging. In the inversion process, one may parameterize the species altitude profile by one of various means, which include: (1) using an analytic function that is perceived to approximate the "true" function; (2) by identifying model parameters with species concentration values on a discrete vertical grid; and (3) through an expansion in a set of basis functions (i.e., splines or empirical orthogonal functions), which are often truncated to increase computational speed.

In order to manipulate a function governing a physical system, while maintaining generic shape of a function, for achieving function fitting, inversion of data, or pattern recognition, construction of a parametric "forward model" of the measurement process may be needed to compute the optimal values of the parameters by systematic comparison of the forward model values with the measured data. The similarity transformation method of the present invention works well with standard algorithms for computing optimal values.

The task of achieving function fitting, inversion of data, and pattern recognition requires the selected parametric representation to be robust in order to access the range of values that a physical system can occupy. The parametric representation must also be constrained to prevent unrealistic or nonphysical states/values to be accessed through manipulation of the parameters. For example, if one uses an overly robust function to attempt a smoothing of noisy data, the function may "fit the noise" rather than the smooth representation desired.

The analytic function approach, as described above, sufficiently constraint the forward model to prevent undue influence by noise. The analytic function approach often requires a minimal number of model parameters to be evaluated. This approach, however, lacks the robustness to capture faithfully all of the possible states of the system or object of interest.

The second and third approaches, as noted above, identify model parameters with species concentration values on a discrete vertical grid, or with coefficients of an expansion in a set of basis functions, respectively, require the evaluation of more model parameters. Further, some form of regularization or a priori information is necessary to ensure smoothness of the retrieved representation in the presence of noise, in order to prevent the models from becoming sufficiently flexible to "fit the noise", or to become computationally unstable. Thus, there is a need for a method to overcome the problems as identified above.

Accordingly, the present invention proposes a method to overcome the above identified problems. The present invention embeds detailed information on the shape of a physical function in a discrete (grid-based) representation. The present method includes advantages of the analytic function approach without the drawback of having to identify or concoct an analytic representation that is both physically faithful and robust. Detailed shape information may be obtained from past discrete data on the system or function of interest, fields of discrete function values derived from detailed simulations or from analytic theory. The similarity transform method of the present invention enables the determination of universality of function shapes in various models or data sets as functions of environmental conditions, location, time, etc. For example, given a species number density profile that is known or assumed to be typical, the similarity transformation method of the present invention produces a parametric function that ranges over the infinite set of profiles having the same generic shape properties (ordering of local extrema, inflection, points, etc.). This explicit shape constraint ensures smoothness in fitting noisy data by the parameterized function.

The present method provides a framework for extracting generic profile shape information, in the form of a non-dimensional shape function, from observations, physics-based numerical simulations, or analytic theory. In this way, the present method facilitates analysis of general characteristics of species concentration variations with coordinates and with other indexing parameters. For DIT retrievals of species concentration profiles from atmospheric observations, the similarity transform-based forward model embeds the generic ("basis") shape information directly into a parametric representation of each species profile. The representation may also be used to cover the extraction of non-dimensional shape functions from discrete data or simulations, the basic forward model representation, and generalizations of the basic approach.

In another embodiment, the method of the present invention may be used to represent multivariate functions, as well as single variable functions. For multivariate functions, the method involves division of the basis shape function into contiguous hyper-subsurfaces by partitioning the basis shape function domain into contiguous subsets. Likewise, the forward model domain is also partitioned and mapped with the basis function subsurfaces for corresponding subsets of the forward model domain.

In one aspect, a method of providing parameterized representation of geophysical functions for use in retrieving the geophysical functions from remote sensing data, comprising: obtaining atmospheric measurements; extracting generic profile shape information from the measurements; embedding the profile shape information in a parametric discrete grid-based profile representation model (forward model); and retrieving species concentration profiles from the forward model. The data is preferably obtained by remote sensing systems. The data may also be obtained by numerical simulations. The profile shape information is preferably extracted at every latitude-longitude grid point for maintaining an approximate universality of species profile shape under specific geophysical conditions. The shape information is extracted using Discrete Inverse Theory (DIT). The forward model provides a parameterized representation of a signal without statistical noise (true signal). The values of the forward model are manipulated to fit said forward model to said true signal. The method of providing parameterized representation, as above, is performed to accomplish at least one of function fitting, inversion of data, graphical display and data visualization, pattern recognition, or data synthesis functions.

In another aspect, method for extracting generic shape information on functions having one or more variables, comprising: measuring atmospheric data by remote sensing; defining dimensionless similarity variable and dimensionless shape function; extracting discrete values of the shape function; performing function manipulation and retrieval from the extracted discrete values; selecting a basis function; defining a forward model $N_f$ for a ground truth function, the forward model representing an exact profile of the property of interest that underlies the data; performing fitting process on the forward model while maintaining underlying shape function constant; ensuring that the forward model function is similar in shape to the basis function; iterating the step of performing the fitting process if the forward model function is dissimilar in shape to the basis function; and mapping the basis function profile to the forward model.

In yet another aspect, a similarity transform method of providing parameterized representation of geophysical functions for use in retrieving the geophysical functions from remote sensing data, comprising: obtaining function samples; extracting generic profile shape information from the samples; embedding the profile shape information in a parametric discrete grid-based profile representation model (forward model); fitting the forward model to the samples to obtain fitted forward model; and retrieving species concentration profiles from the fitted forward model to retrieve geophysical functions.

Still other objects and advantages of the present invention will become apparent to those skilled in the art from the following detailed description, wherein only the preferred embodiment of the invention is shown and described, simply by way of illustration of the best mode contemplated of carrying out the invention. As will be realized, the invention is capable of different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE INVENTION

Figure 1:
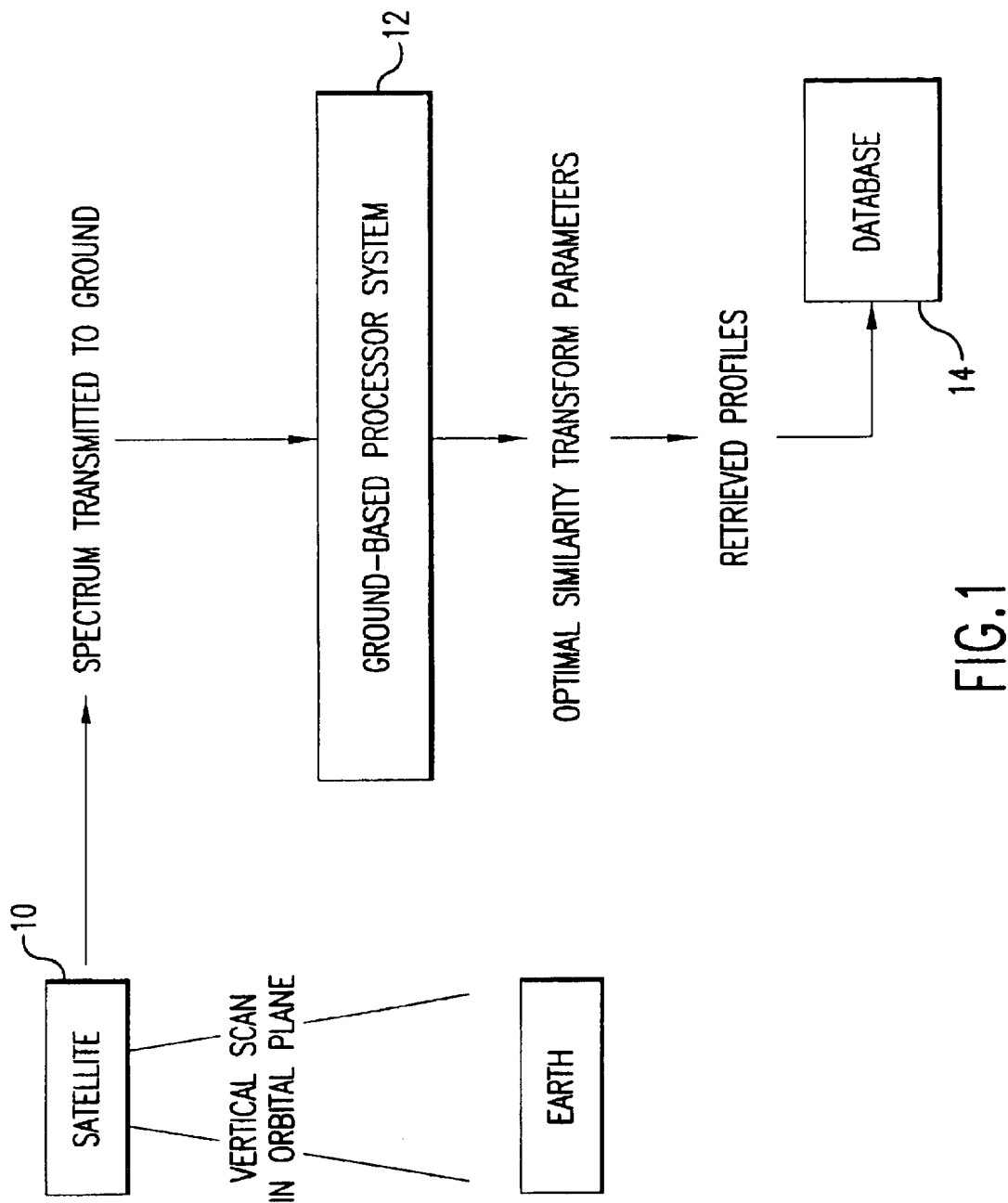
FIG. 1 shows a system for obtaining samples of functions and processing the obtained samples to obtain optimal parameter values in accordance with the present invention.

In the drawings, like or similar elements are designated with identical reference numerals throughout the drawings, and the various elements depicted are not necessarily drawn to scale.

FIG. 1 shows a system for obtaining samples of functions and processing the obtained samples to obtain optimal parameter values in accordance with the present invention. Here, a satellite system 10 may be used to scan earth's atmosphere in order to measure and obtain samples of a variety of functions. For example, profiles of the atomic oxygen may be obtained as a function of altitude. The measures spectrum may then be transmitted to earth via a wireless communication network. Any known communication protocols may be used in order to communicate the measured information from satellite 10 to a ground based processor system 12. The ground-based processor system 12 may be a computer system having logic to process the information, received from the satellite 10, to determine optimal similarity transform parameters and to retrieve optimal parameter profiles. Model parameter values computed by the processor system 12 may be stored in a database system 14 which may be local or remote to the processor system 12.

Section 1

Figure 6:
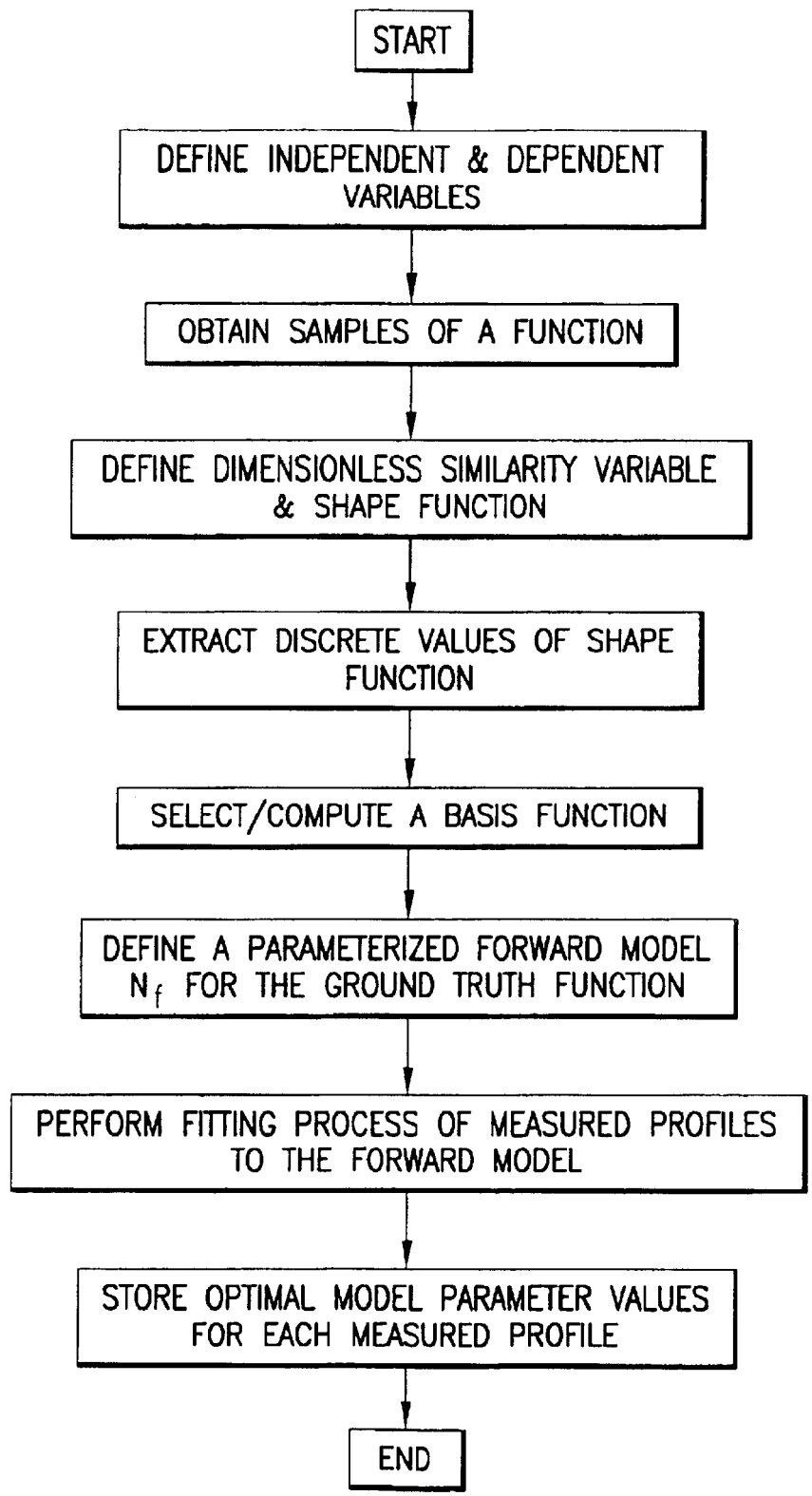
FIG. 6 shows a detailed flow chart for similarity transform method that provides parametric representation of geophysical functions for use in retrieving such functions from remote sensing observations.
Figure 7:
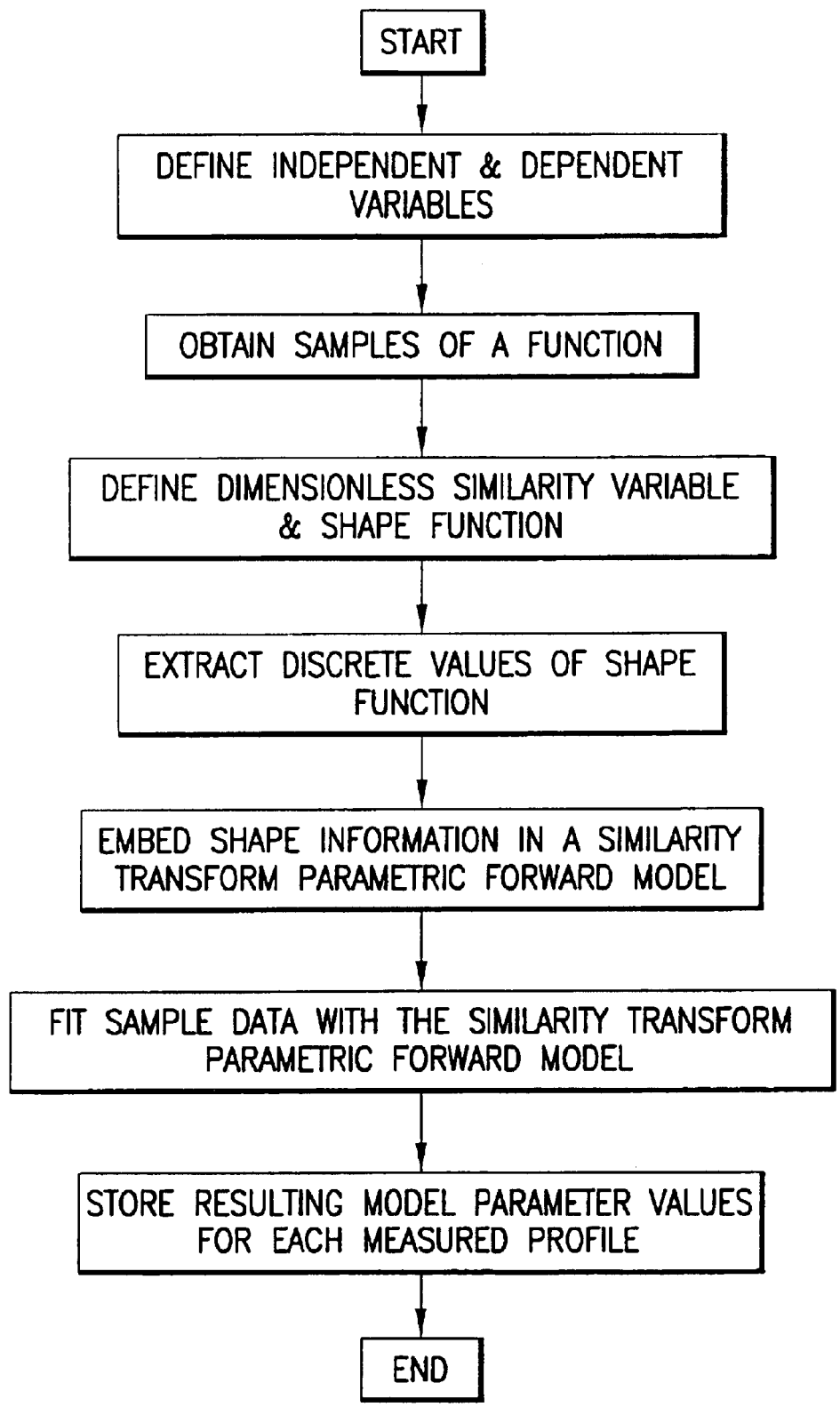
FIG. 7 shows an overall flow chart for similarity transform method as in FIG. 6.
Figure 8:
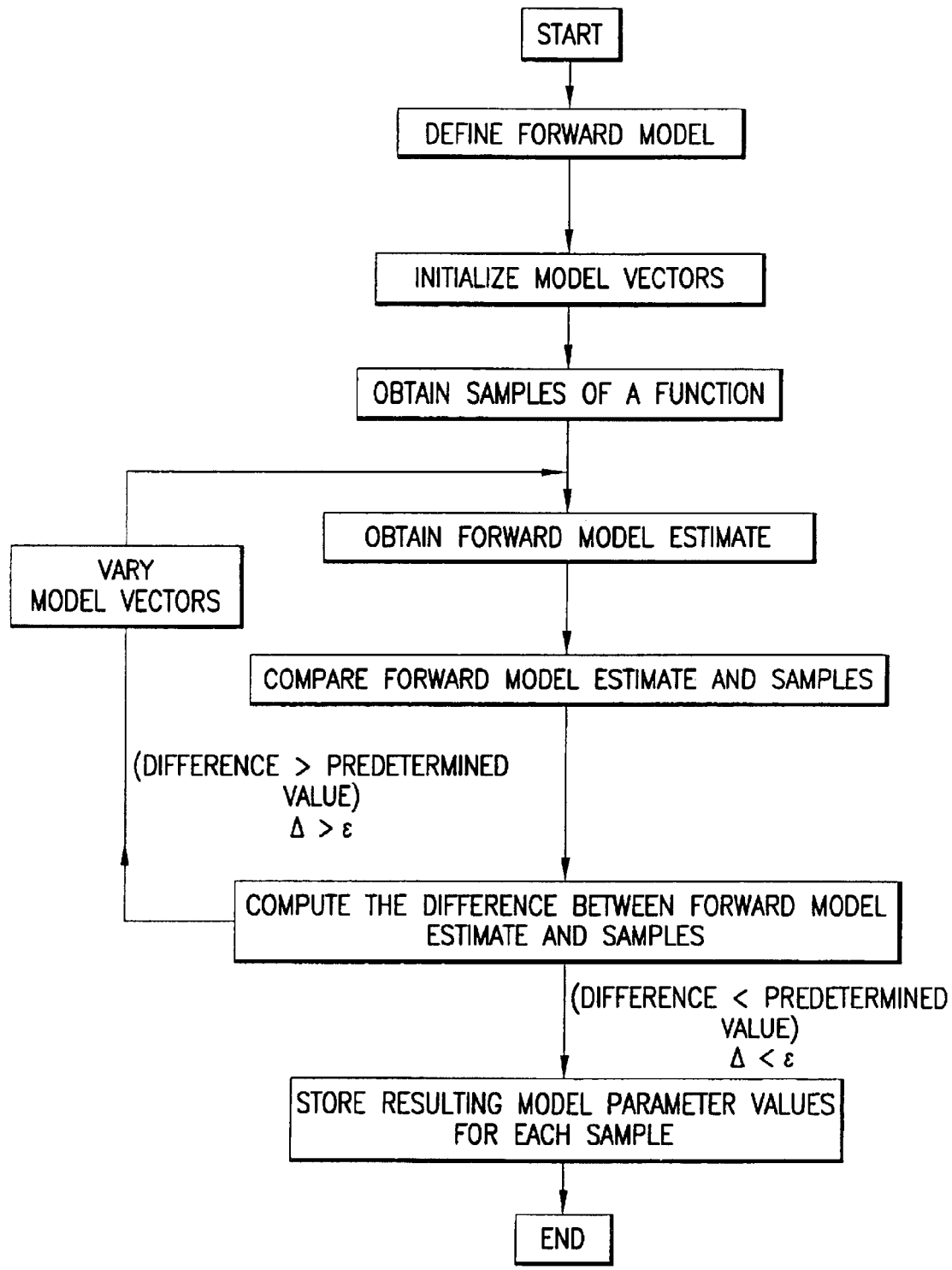
FIG. 8 shows details of fitting process to obtain optimal model parameter values as shown in FIGS. 6 and 7.

With respect to FIG. 6, consider a function N(z), describing the variation of an atmospheric property, such as, for example, species density or its logarithm) with altitude z, over a domain $[z_0, z_M]$. Assume that a physical system or function has a true or noiseless values $\{N(z_i); i=0, 1, \ldots, M\}$ on a monotonically increasing discrete grid $\{z_i; i=0, 1, \ldots, M\}$, so that $z_0 < z_1 < \ldots < z_M$. Define a dimensionless similarity variable as shown in Equation 1:

$$\eta(z) \equiv \frac{z - z_0}{z_M - z_0} \qquad (1)$$

Now, define a dimensionless shape function as shown in Equation 2

$$g(\eta(z)) \equiv \frac{N(z) - N_0}{N_M - N_0} \qquad (2)$$

where $N_0 \equiv N(z_0)$ and $N_M \equiv N(z_M)$ and $N_0 \neq N_M$. Notice that $\eta$ varies from 0 to 1, linearly with z, and that $g(0)=0$ and $g(1)=1$. Equations (1) and (2) then allow us to express the function N(z) in terms of the similarity variable and shape function:

$$N(z,m) \equiv N_0 + g(\eta(z))[N_M - N_0] \qquad (2.1)$$

where the model parameter vector $m=[z_0, z_M, N_0, N_M]$ is included to point out the dependence of N, $\eta$, and g on the parameters $z_0, z_M, N_0$, and $N_M$.

Figure 1A:
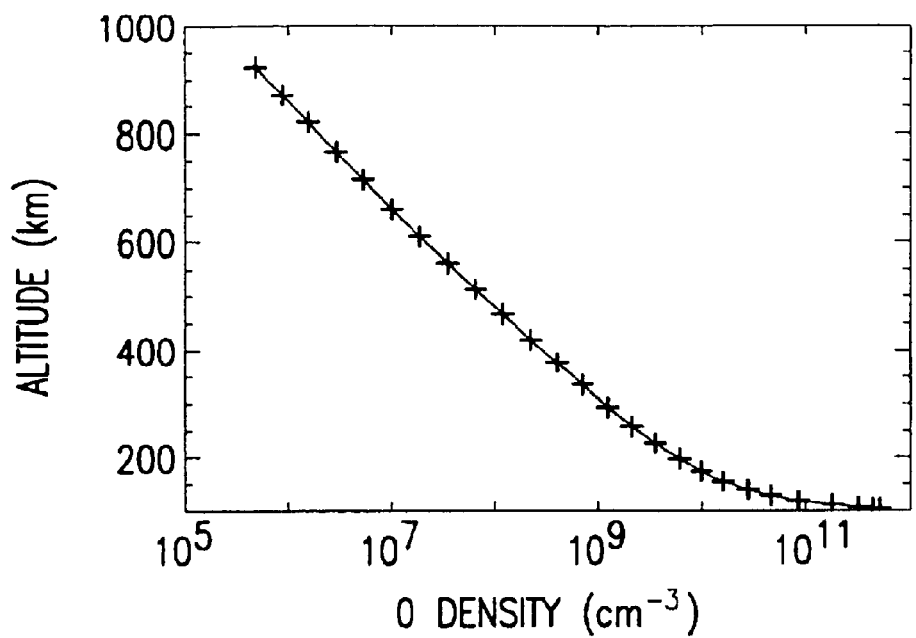
FIG. 1a illustrates an exemplary profile of the atomic oxygen number density [O](z) as generated from the MSISE-90 empirical model, where g(η) is computed from [O](z), where z is the altitude.
Figure 1C:
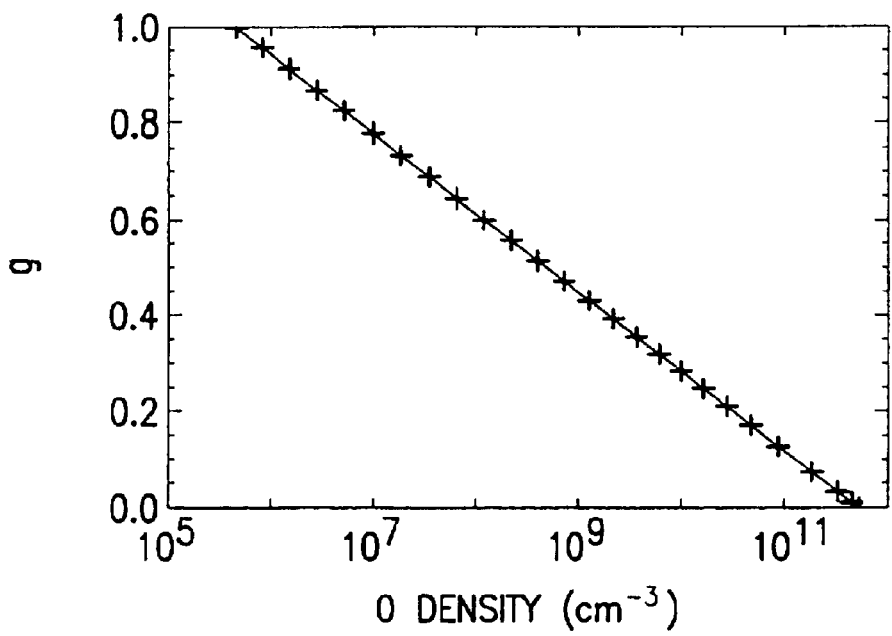
FIG. 1c illustrates a profile of a shape function, g[η(z)] versus [O](z)
Figure 1B:
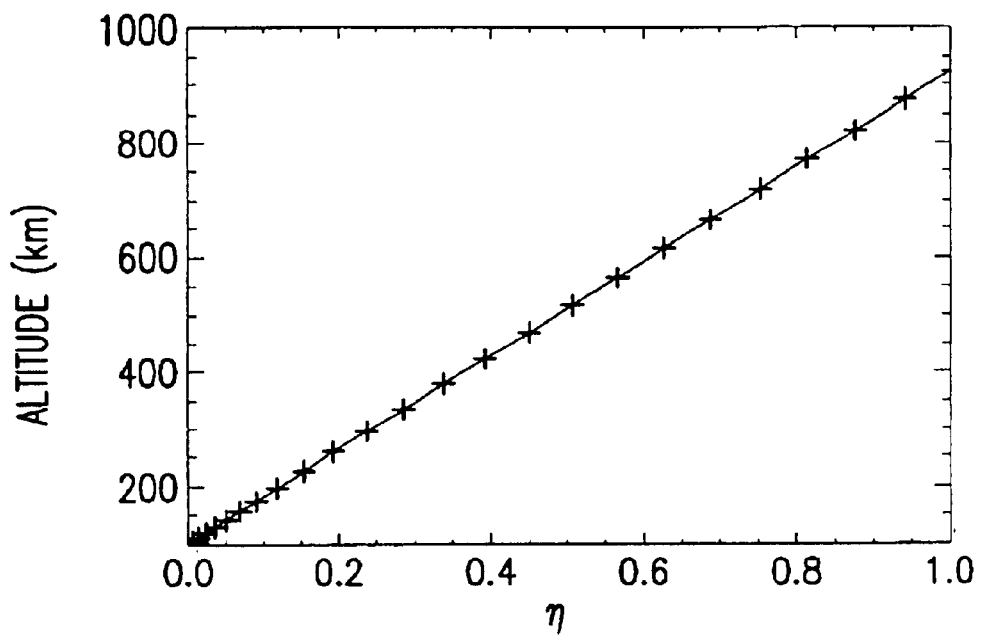
FIG. 1b illustrates a profile of similarity variable, η(z), as a function of altitude.
Figure 1D:
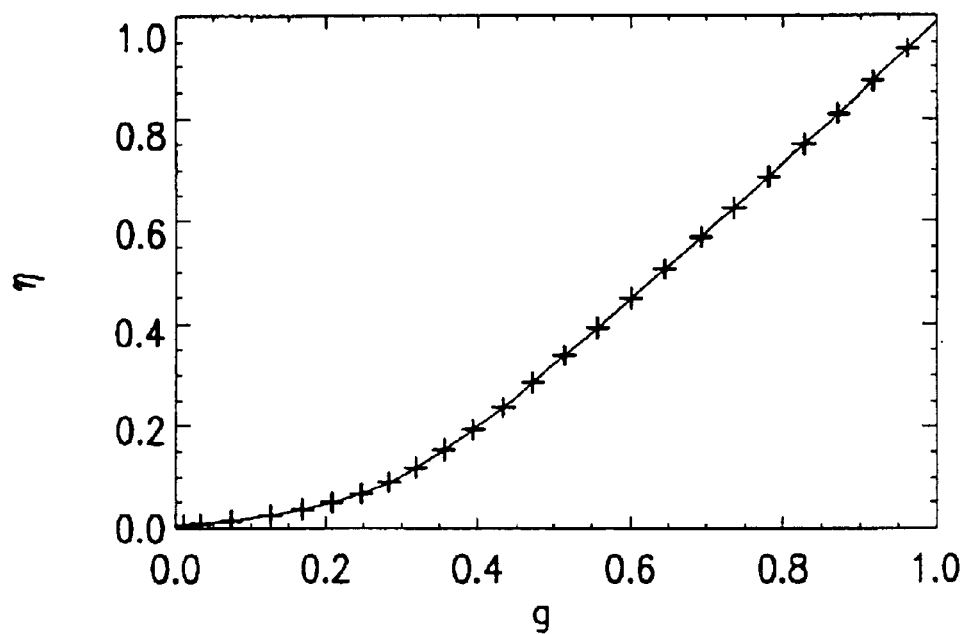
FIG. 1d illustrates a profile of the shape function g[η(z)] versus η.
Figure 2A:
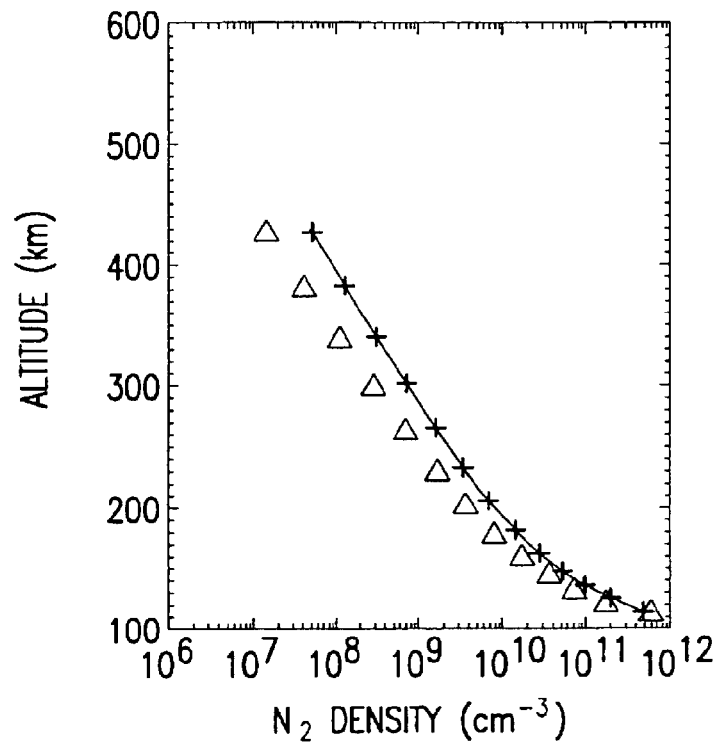
FIGS. 2a–2c show non-linear least squares fits of similarity transform-based model profiles to respective exact species density profiles, the triangles illustrating the profiles used to initialize the fitting calculations.
Figure 2D:
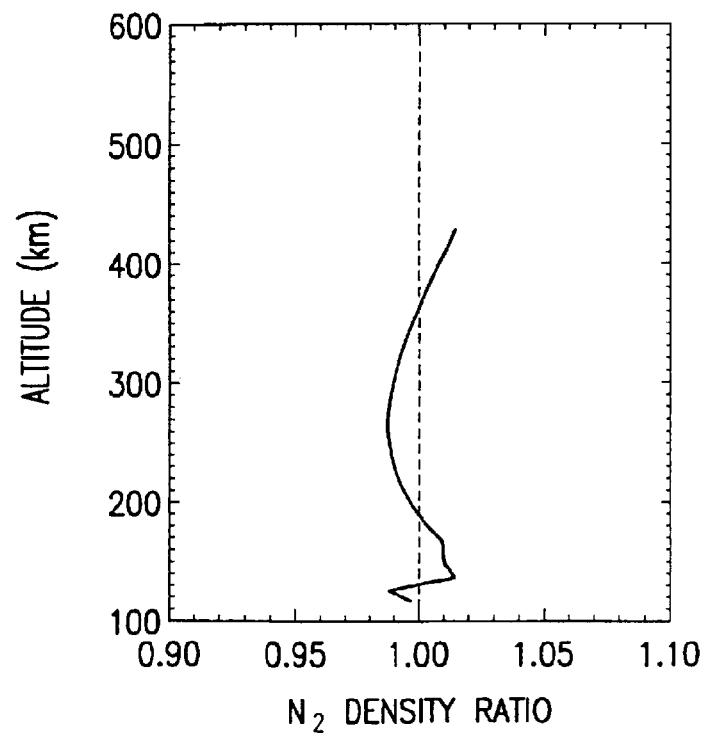
FIGS. 2d–2f show the ratios of the fitted profiles to the corresponding exact profiles as shown in FIGS. 2a–2c, respectively.
Figure 2B:
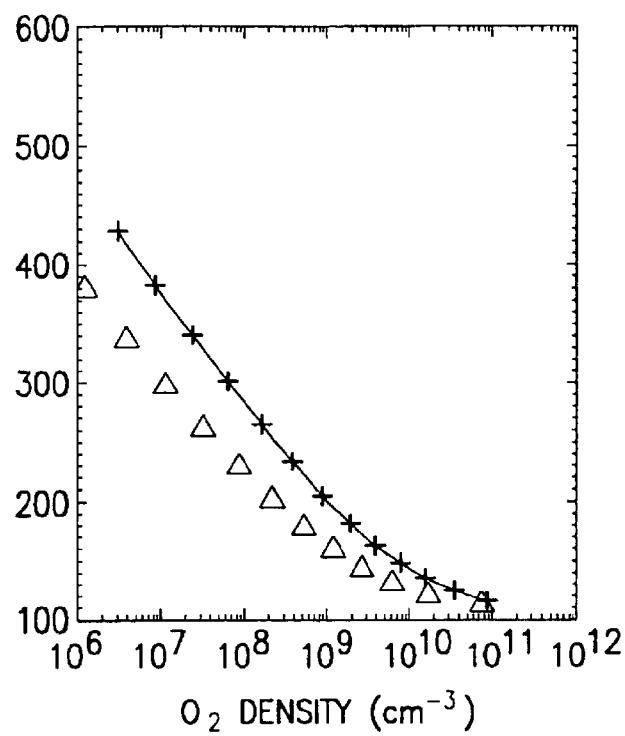
Figure 2E:
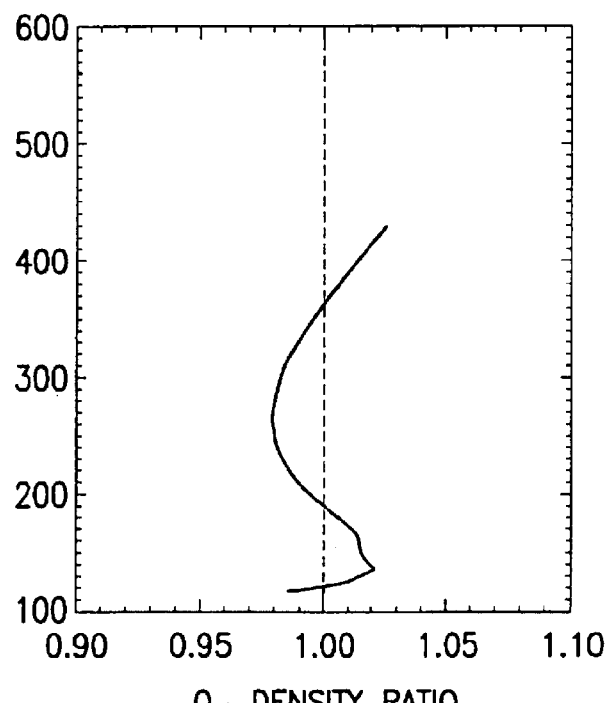
Figure 2C:
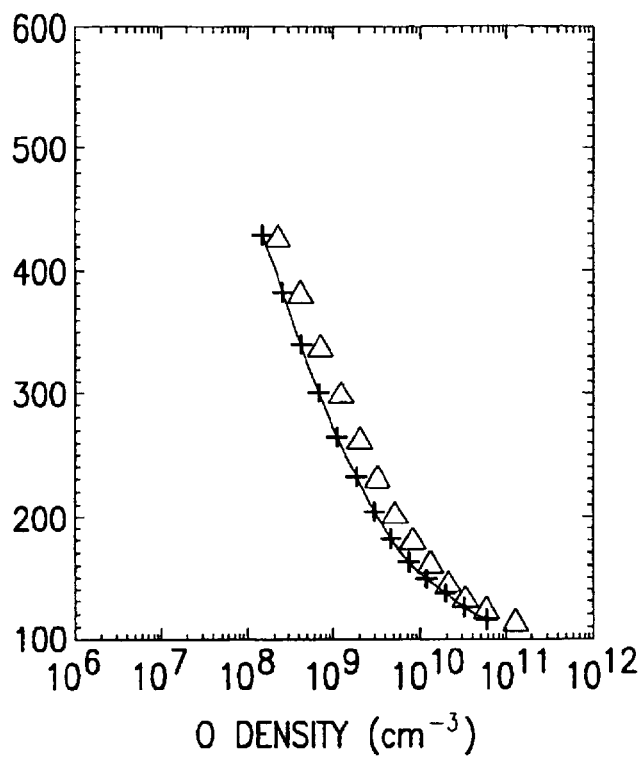
Figure 2F:
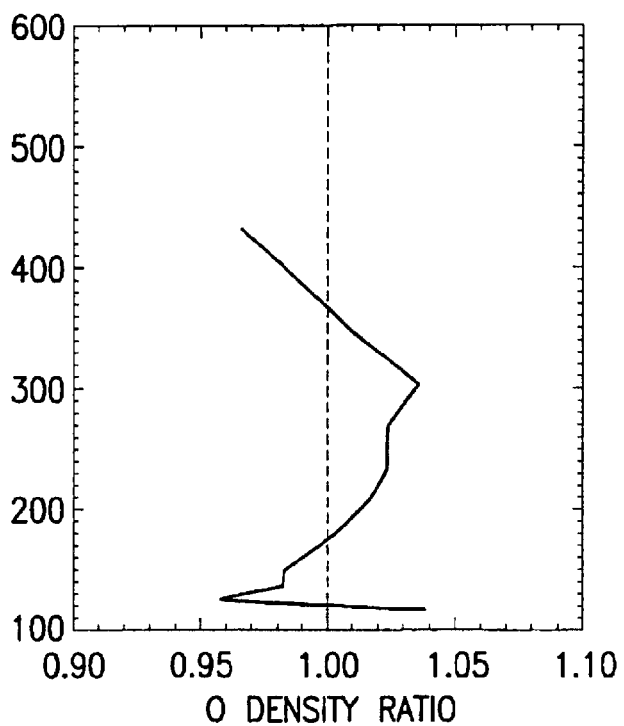
Figure 3A:
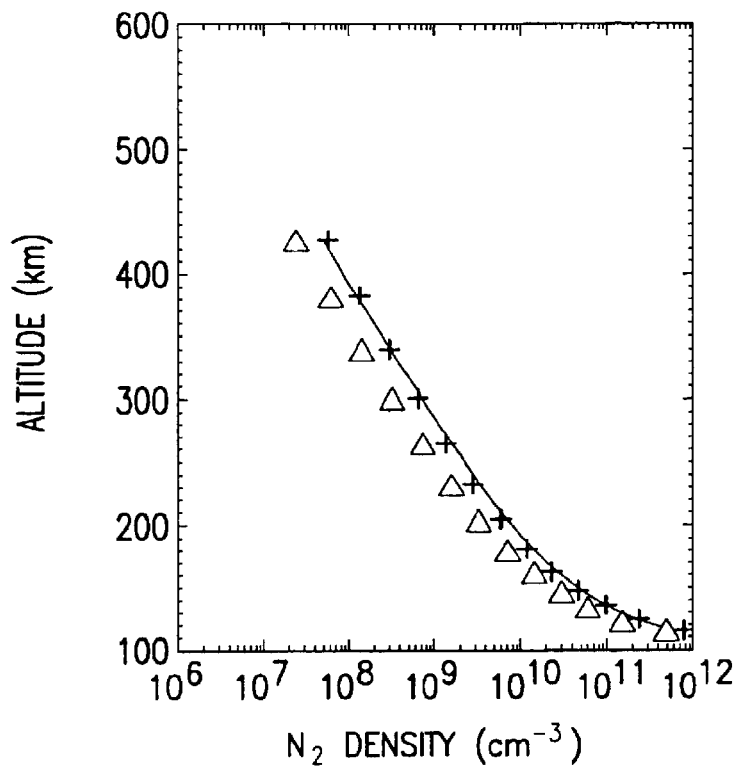
FIGS. 3a–3c show fits of a state-of-the-art MSIS-based forward model to MSISE-90 altitude profiles of $N_2$, $O_2$, and [O], respectively.
Figure 3D:
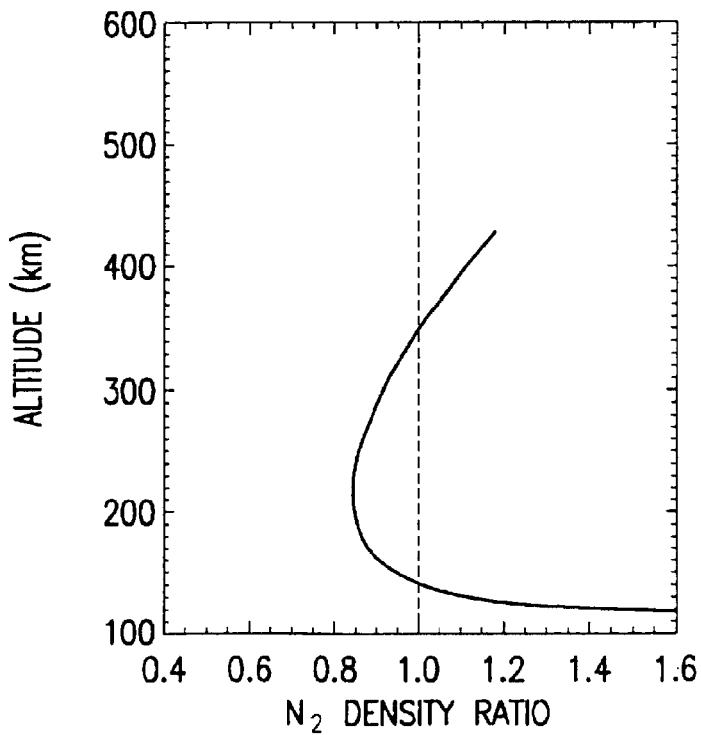
FIGS. 3d–3f show the ratios for the corresponding profiles of FIGS. 3a–3c, respectively.
Figure 3B:
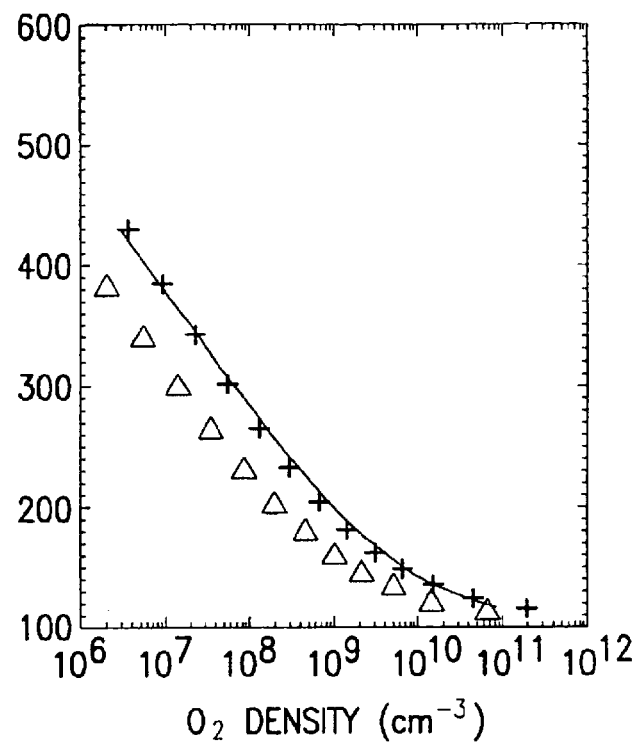
Figure 3E:
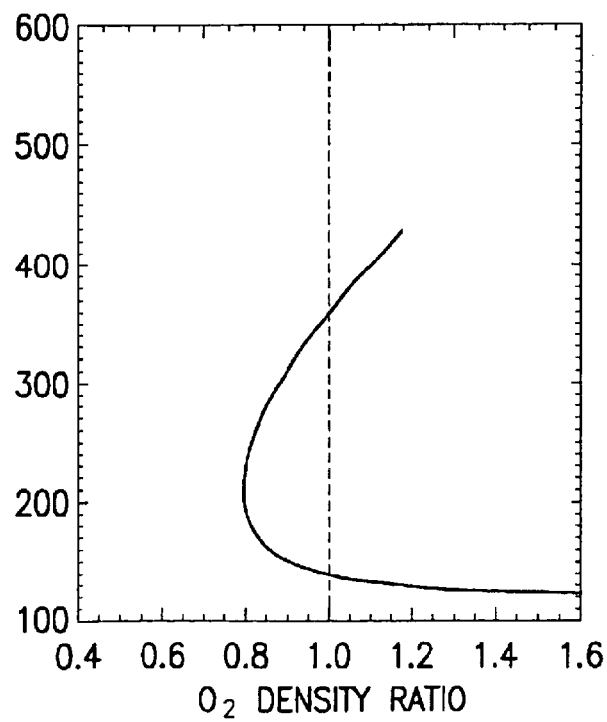
Figure 3C:
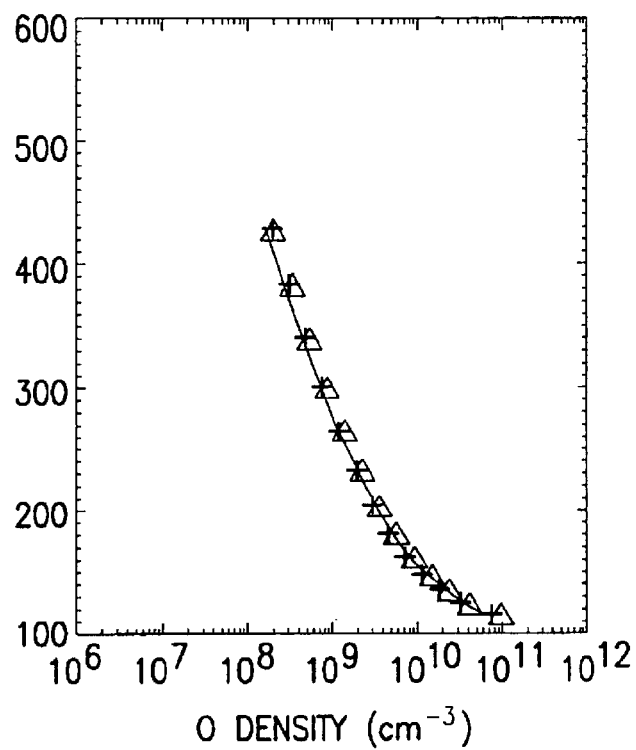
Figure 3F:
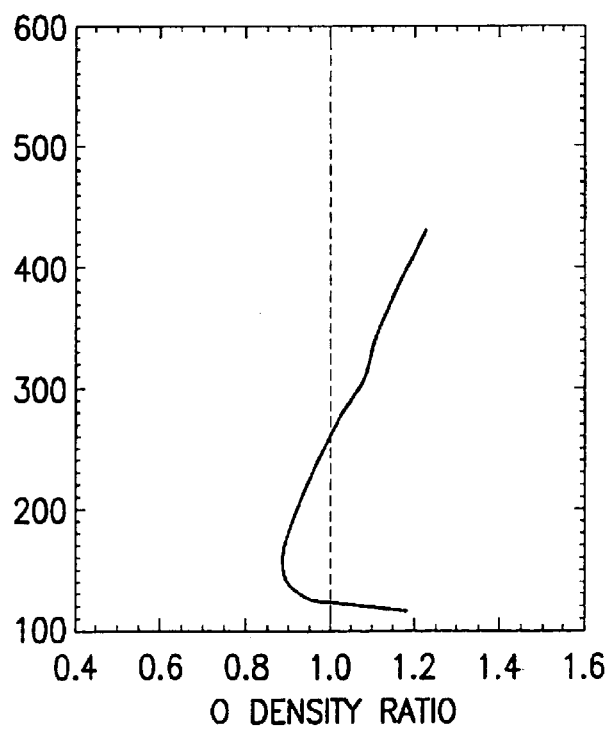

From the discrete function, Equations (1) and (2) may be used to extract the discrete values of the shape function $g_i = g(\eta_i) = g(\eta(z_i))$. FIG. 1(a) shows an example derived from a Mass Spectrometer Incoherent Scattered Empirical (MSISE-90) calculation of the atomic oxygen number density, [O](z), covering several decades. In this example, N(z) is log [O](z), where "log" denotes the natural logarithm. In FIGS. 1(b) and 1(d), both $\eta$ and g vary from 0 to 1 as "z" varies from the lowest to the highest grid points defining the altitude profile. FIG. 1(c) further reveals a linear relationship between the shape function and the corresponding logarithmic density profile, the profile being consistent with Equation (2). The shape function therefore captures the manner in which the atmospheric property varies over its domain, independent of the actual range of physical values or the size of the domain.

The non-dimensionalization in Equations (1) and (2) places all functions describing a given system in the domain $[z_0, z_M]$ on a more equal footing and, for example, permits a direct comparison of profiles of a given atmospheric property under different conditions or at different locations. To obtain values of the function or system property at a particular value of z, where $z_0 \notin \{z_i\}$ but $z_0$ z $z_M$, one must interpolate.

Section 2

The terminology of Discrete Inverse Theory (DIT) is adopted for the discussion herein. By convention, the subscripts "b", "d", and "f" signify the "basis function", "the ground truth function underlying the data", and the "forward model", respectively. First, select a basis function, with a shape function $g_b$ that is expected to provide an acceptable representation of, or fit to, the shape function $g_d$ of the ground truth function $N_d$ that underlies the data. Using the shape extraction method as in Section 1, studies of numerical simulations, of direct observations or of analytic models, would provide information on the specific basis shape function(s) that would be appropriate, or a user can assume that a specific sample function is adequate, and then test the assertion by application to actual data or numerical simulations.

In practical situations, the basis function comprises of discrete values $N_b(z_{bi})$, defined at M'+1 points $Z_b$ $\{z_{bi}, I=0, 1, \ldots, M'\}$. Equations (1) and may then be used to provide the basis shape function values $\{g_b(\eta_b(z_{b1}))\}$, where $\eta_b(z_{b0})=0$ and $\eta_b(z_{bM'})=1$. Obtaining values $g_b(\eta_b(z))$ for $z \notin Z_b$ with $z_{b0} < z < z_{bM'}$ requires interpolation within the set $Z_b$. For example, quadratic and spline interpolation may be used. On the other hand, extrapolation outside of the basis function domain is arbitrary, and therefore may not be optimal. The use of constraints on forward model parameters, such as, for example, ($z_{fB}$ and $z_{fT}$) during inversion calculations may prevent extrapolation.

Given the basis shape function, Equations (1) and (2) may also be used to define a forward model $N_f$ for $N_d(z_{d1})$, the ground truth function of the system property of interest which underlies the data. In order to fit direct observations of N(z), the forward model is evaluated at the data grid points $\{z_{di}; I=1, 2, \ldots, M\}$. For indirect observations, a user may select points at which the forward model is to be evaluated. The model parameter vector, to be evaluated from the data by DIT, is m $[z_{fB}, z_{fT}, N_{fB}, N_{fT}]$, where "B" and "T" denote "bottom" and "top", so that $z_{fB} < z_{d1} < z_{dM} < z_{fT}$, $N_{fB}$ $N_f(z_{fB})$, and $N_{fT}$ $N_f(z_{fT})$. The forward model similarity variable corresponding to the point, $z_{di}$, is shown in Equation (3):

$$\eta_f(z_{di}) \equiv \frac{z_{di} - z_{fB}}{z_{fT} - z_{fB}} \qquad (3)$$

and the forward model value for the retrieved property at that location is $$N_f(z_{di}) \equiv N_{fB} + g_f(\eta_f(z_{di}))[N_{fT} - N_{fB}] \qquad (4)$$

Defining $g_{f[i]} \equiv g_f(\eta_f(z_{di}))$ and $g_{b[i]} \equiv g_b(\eta_f(z_{di}))$, where the square brackets distinguish the data point index from the subscripts "f" and "b" and from the basis grid indices, one may complete the forward model by identifying the vector of shape function values $g_f = [g_{f[1]}, g_{f[2]}, \ldots, g_{f[i]}, \ldots, g_{f[M]}]$ with the corresponding values of the basis shape function $g_b = [g_{b[1]}, g_{b[2]}, \ldots, g_{b[i]}, \ldots, g_{b[M]}]$, i.e., $$g_f = g_b \qquad (5)$$

This ensures that all forward model functions will be similar in shape to the basis function. During the fitting process, $(\eta_f(z_{di})$ may change from iteration to iteration for each "i", so that the vector $g_f$ may also change. On the other hand, the underlying shape function $g_f(\eta) = g_b(\eta)$ does not change. It should be noted that in the terminology for generalization of the present method for functions of a single variable, Equations (3)–(5) define an "L=1" forward model, where L is the number of contiguous segments of "g" that are being mapped to the data or to an exact profile.

Equations (3) and (4) show that manipulation of "m" permits to shift the basis function to higher or lower values of $N_f$ and to stretch or compress the basis function to ground truth function $N_d(z_{d1})$. It should be noted that compression may degrade accuracy by forcing the fitting code to extrapolate the basis shape function beyond the domain on which $g_b$ is defined, i.e., to $\eta_f$ outside the interval [0,1]. The transformation represented by varying "m" is generally referred to as "similarity transformation", since the transformation maintains the non-dimensional shape characteristics embedded in $g_b(\eta)$.

Consider the following example to demonstrate the retrieval process and to permit potential users to test the method of the present invention. The simulated data comprises of MSISE-90 profiles of neutral species number densities ($[N_2]_d, [O]_d, [O_2]_d$), evaluated at altitudes $z_{di}$ in the interval [120, 450] km. The specific thermospheric conditions correspond to latitude 67.5° and longitude 220° during a major geomagnetic storm: year 1982, day 195, local time 0900 hr, Ap 153, $F_{10.7}$=260, and 81-day average ($F_{10.7}$)=168. Note that 3-hr ap inputs were used in MSISE-90 and that the Ap value is given only for perspective on this pathologically active day. Fitting the natural logarithm of the data, {$N_{sd}$($z_{di}$)log([$x_s$]$_d$($z_{di}$)); s=1, 2, 3; $x_1=N_2, x_2=O_2, x_3=O$; i=1,2, . . . , M}, provided the best results. For this exemplary illustration, the synthetic data does not include noise. Consequently, the covariance of the data, [cov d], was set to the identity matrix, so that $\chi^2$ is the sum over species of the squared residuals at the data grid points (unweighted non-linear least squares fit). Because the shape function $g_{sf}(\eta)$ does not vary from iteration to iteration, convergence has always occurred using the present method.

Basis and Forward Model Shape Functions

In order to calculate the basis profile, considering similar thermospheric conditions, but specifying latitude and longitude to be −2.5° and 140°, respectively. Select a basis grid with $z_{bi}$ in the interval [$z_{b0}, z_{bM'}$]=[102, 923] km, where the number of points is M'+1=26. FIG. 1 shows the basis values for atomic oxygen under these conditions. Given the log values of the basis density for each species "s" at the basis grid points, i.e., {$N_{sb}(z_{bj})$=log ([$x_s$]$_b$($z_{bj}$)); s=1, 2, 3, ; j=0, 1, . . . , M'}, use Equations (1) and (2) to generate separate shape functions {$g_{sb}(\eta_b(z_{bj}))$; s, j ranging} for the species.

Then, at each iteration of the fitting process, for each species, and at each "data" grid point $z_{di}$, evaluate the similarity variable $\eta_{sf}(z_{di})$ using Equation (3), and then interpolate the species basis shape function values to the data grid $z_{di}$ values $g_{sf}=g_{sb}$, as in Equation (5). Equation (4) may be used to compute separate forward model values for each species on the "data" grid {$z_{di}$}.

Initialization of the Model Parameter Vector

The model parameter vector is m=[$z_{fB}(N_2), z_{fT}(N_2), z_{fB}(O_2), z_{fT}(O_2), z_{fB}(O), z_{fT}(O)$, log [$N_2$]$_{fB}$, log [$N_2$]$_{fT}$, log [$O_2$]$_{fB}$, log [$O_2$]$_{fT}$, log [$O$]$_{hd\ fB}$, log [$O$]$_{fT}$T]. Denote initial model parameter values by superscript "0" and choose the component values of $m^0$ to be identical with the basis values, i.e., $z_{fB}^0(N_2)=z_{b0}$, $z_{fT}^0(N_2)=z_{bM'}$, etc. For every species $x_s$, this ensures that $z_{fB}^0(x_s)<z_{d1}$ and $z_{fT}^0(x_s)>z_{dM}$ and that $\eta_{sf}^0(z_{d1})\in[0,1]$ for every data grid point $z_{di}$. Thus the data grid falls entirely within the forward model altitude domain, a situation which should be maintained during the fitting or inversion process. Failure to do so for a given species $x_s$ would result in up to two non-null subsequences, $\alpha_L$ and $\alpha_U$, of the data grid indices, such that the corresponding subset of $\eta_{sf}$-coordinate values would be outside of the unit interval, i.e., {$\eta_f(z_{di})$; i$\in\alpha_L\cup\alpha_U$}$\not\subset[0,1]$, causing extrapolation of the shape function. On these subsets, the information embedded in $g_b$ would not be entirely useful, and the overall inversion results would be unpredictable.

Section 3

Figures 4A, 4B, 4C:
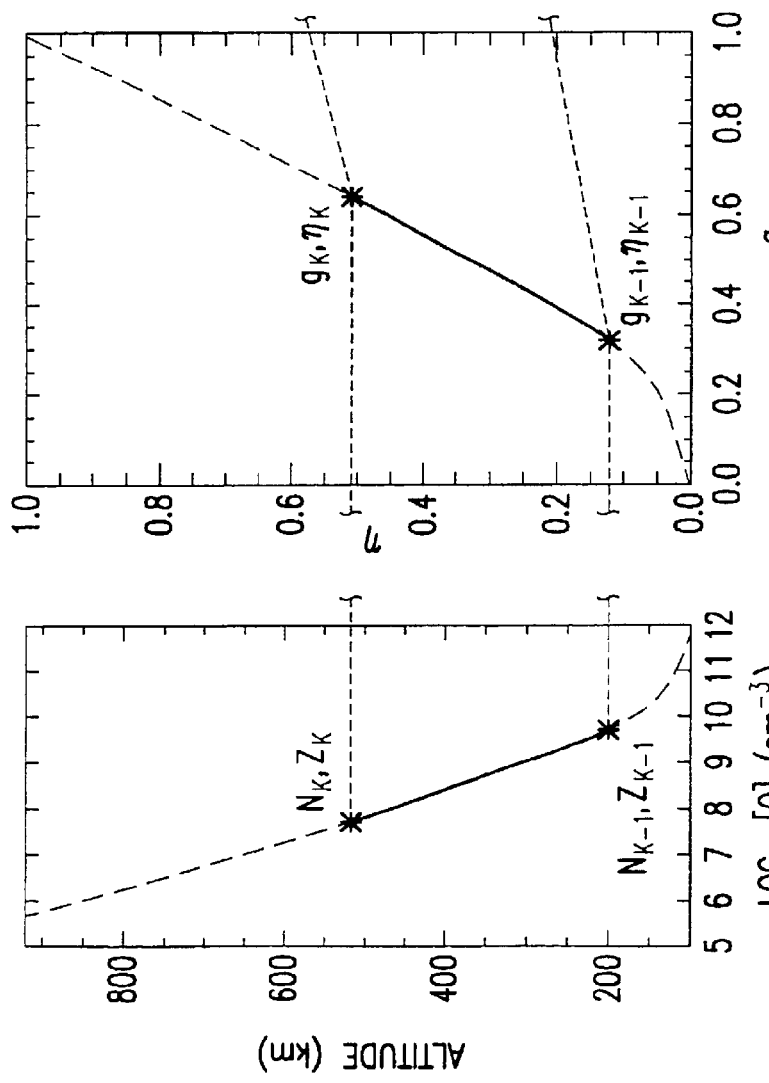
FIGS. 4a–4c show the mapping of one segment of the basis shape function onto the corresponding semiopen subinterval within the overall domain of the forward model.
Figure 5A:
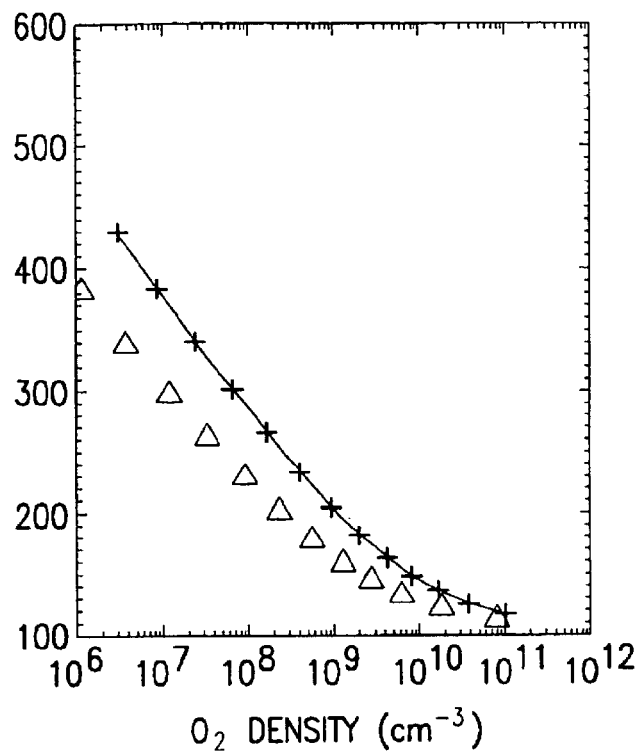
FIGS. 5a–5c show fits (for L=2) of forward model to MSISE-90 altitude profiles of $N_2$, $O_2$, [O], respectively.
Figure 5D:
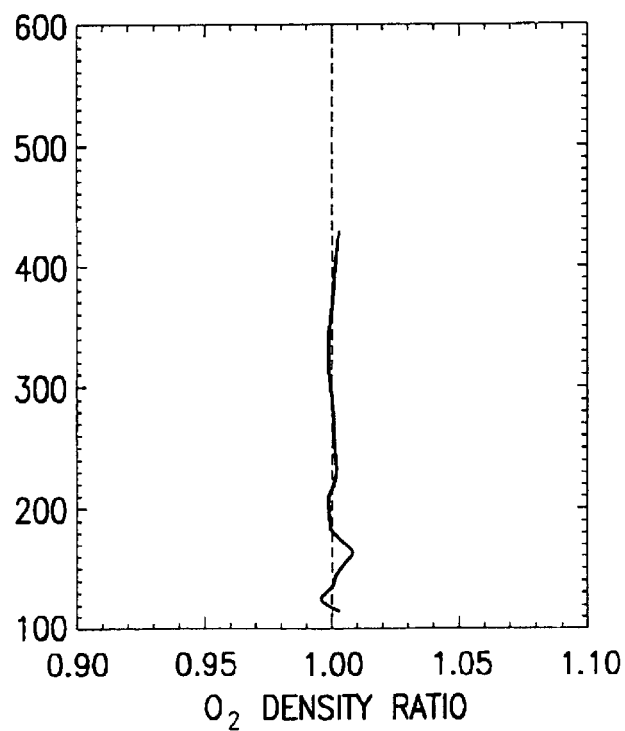
FIGS. 5d–5f show the ratios for the corresponding profiles of FIGS. 5a–5c, respectively.
Figure 5B:
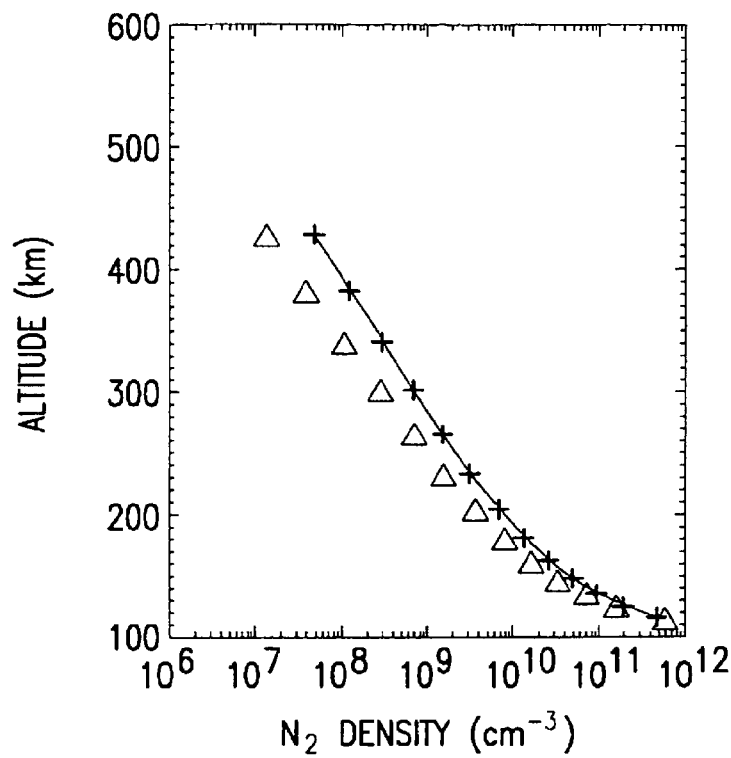
Figure 5E:
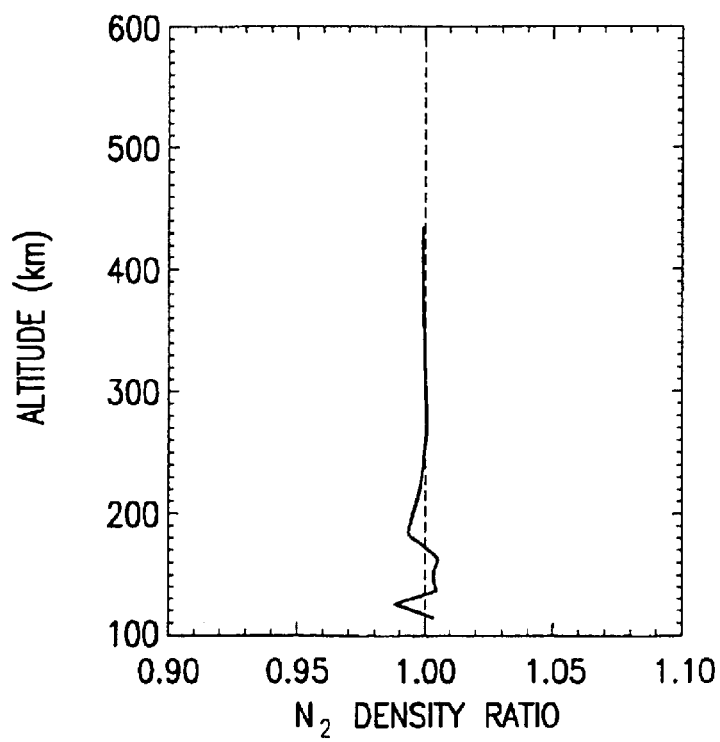
Figure 5C:
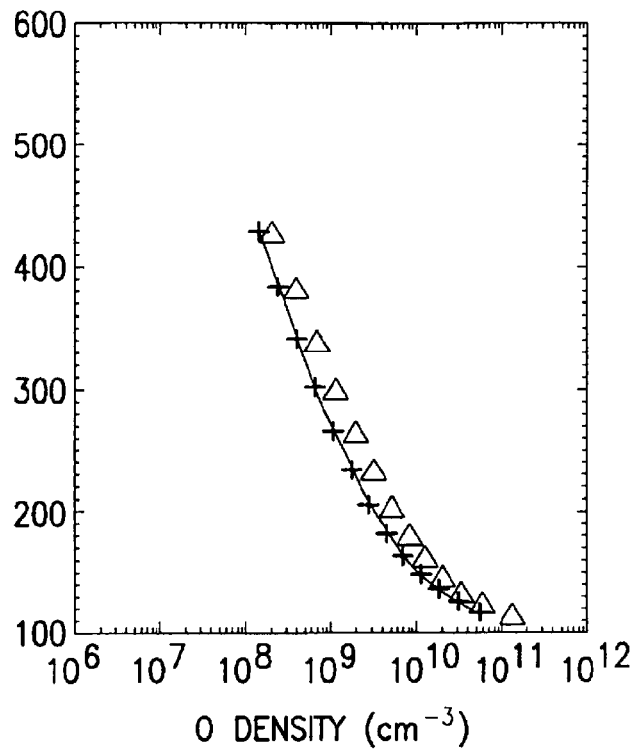
Figure 5F:
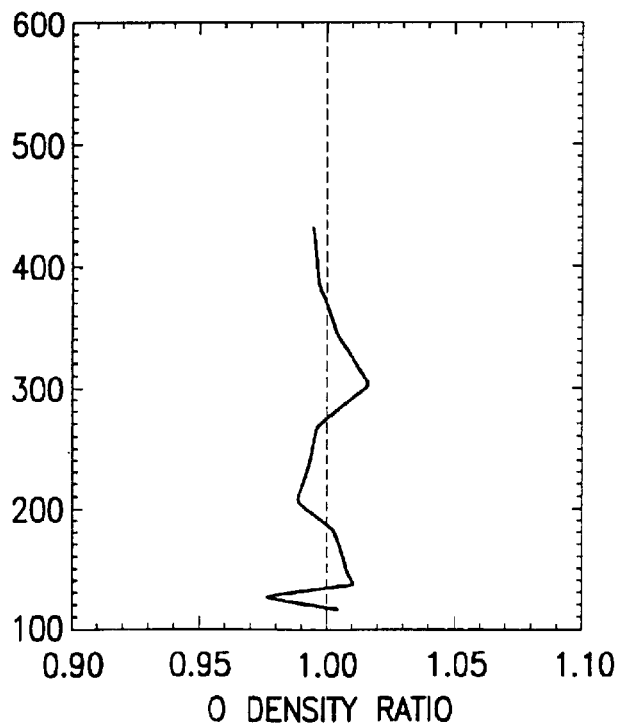

In this section, a piecewise fitting of the basis shape function is adopted for contiguous subsets of the data vector or of an exact profile, thus permitting the definition of separate, but connected, forward models for the contiguous subsets, with each forward model stretching or shifting a portion of the basis shape function in order to achieve an optimal fit to the respective subset. FIG. 4(b) shows the mapping of one segment of the basis shape function, excluding the endpoint at $\eta_{bk}$, onto the semiopen subinterval [$z_{k-1}, z_k$) within the overall domain [$z_B, z_T$] of the forward model. The adjacent segments of the shape function, shown by dashed lines, similarly map onto corresponding (dashed lines) subintervals of the forward model domain. The fitting calculation determines the optimal locations of the subinterval boundary points.

In a third embodiment, the basis function $g_b$ may be split into an ordered set of L elements, comprising of contiguous sections that may be held "fixed" during the fitting process. This approach involves partitioning the domain of $g_b$ (i.e., $\eta_b\in[0, 1]$) into an ordered set of L contiguous subintervals. Likewise, the forward model is partitioned into altitude interval [$z_{fB}, z_{fT}$] (or equivalently, partition the $\eta_f$ interval [0, 1]) into the same number of (L) subintervals, whose boundary locations {$\eta_{fk}$} and function values {$N(\eta_{fk})$} serve as additional model parameters to be optimized by the fitting process. For data points falling in a given subinterval of the forward model domain, apply the method as in Section 1, using the corresponding segment of $g_b$ to define the forward model, while noting that $g_b=g_f$, as in Equations (3) and (4). This requires remapping of $g_b$, $\eta_b$, and $\eta_f$ in each of the respective subintervals to the unit interval [0, 1]. FIG. 4(c) depicts the remapped segment of $g_b$, denoted $\gamma$, as a function of the remapped similarity variable $\zeta$. Further elaboration of the above techniques are found in Appendix I attached hereto and the contents of which are incorporated herein by reference, as disclosing an article by Picone et al. entitled *Similarity Transformations for Fitting of Geophysical Properties: Application to Altitude Profiles of Upper Atmospheric Species*.

In a fourth embodiment, partition the basis function domain and the forward model domain into ordered sets of L contiguous subintervals, remap the subinterval g and $\eta$ functions, as in the third embodiment. However, the boundary locations of the forward model domain subintervals are held fixed while treating the basis segment endpoint locations $\eta_{bk}$ as model parameters to be varied. The values of the forward model {$N(\eta_{fk})$} remain as model parameters.

In a fifth embodiment, the approach of third and fourth embodiments may be combined by treating both the segment endpoint locations $\eta_{bk}$ of the basis function domain and the corresponding segment endpoint locations $\eta_{fk}$ of the forward model domain as model parameters, along with {$N(\eta_{fk})$}.

In yet another embodiment, the method of the present invention is extended to represent multivariate functions. Assuming that a physical system or function has a true or noiseless values {$N(x_i, y_j, z_k)$; i=0, 1, . . . , I; j=0, 1, . . . J; k=0, 1, . . . K} on a monotonically increasing discrete grid so that $x_0<x_1< \ldots <x_I$; $y_0<y_1< \ldots <y_J$; $z_0<z_1< \ldots <Z_K$. Define a dimensionless similarity variable as shown in Equation 6:

$$\eta_x(x) \equiv \frac{x-x_0}{x_1-x_0}, \eta_y(x) \equiv \frac{y-y_0}{y_1-y_0}, \ldots, \quad (6)$$

and a dimensionless shape function as shown in Equation 7

$$g(\eta_x(x), \eta_y(y), \ldots) \equiv \frac{N(z) - N_0}{N_{I,J\ldots K} - N_0}, \quad (7)$$

where $N_0 = N(x_0, y_0, \ldots, z_0)$ and $N_{IJ\ldots K} = N(x_I, y_J, z_K)$.

A multivariate forward model is then created. Given the basis shape function, in order to fit direct observations of $N(z)$, the forward model is evaluated at the data grid points $\{R_d(i, j, \ldots k) \equiv (x_{di}, y_{dj}, \ldots, z_{dk}); i=1, 2, \ldots, I_d; j=1, 2, \ldots, J_d; \ldots; k=1, 2, \ldots, K_d; \text{ranging}\}$. For indirect observations, a user selects points at which the forward model is to be evaluated. The model parameter vector, to be evaluated from the data by DIT, is m $[x_{fB}, x_{fT}, y_{fB}, y_{fT}, \ldots, z_{fB}, z_{fT}, N_{fB}, N_{fT}]$, where "B" and "T" denote "bottom and "top", so that $z_{fB} < z_{d1} < z_{dK} < z_{fT}$, $N_{fB} \equiv N_f(z_{fB})$ and $N_{fT} \equiv N_f(z_{fT})$ The forward model similarity variable corresponding to the point $R_d(i, j, \ldots k)$ are given by the following equation:

$$\eta_{fx}(x_{di}) \equiv \frac{x_{di} - x_{fB}}{x_{fT} - x_{fB}}, \eta_{fy}(y_{dj}) \equiv \frac{y_{dj} - y_{fB}}{y_{fT} - y_{fB}}, \ldots, \quad (8)$$

and the forward model value for the retrieved property at that location is given by the following equation:

$$N_f(R_d) = N_{fB} + g_f(\eta_{fx}(x_{di}), \eta_{fy}(y_{dj}), \ldots)[N_{fT} - N_{fB}] \quad (9)$$

Defining $g_{f[d]} \equiv g_f(\eta_{fx}(x_{di}), \eta_{fy}(y_{dj}), \ldots)$ and $g_{b[d]} \equiv g_b(\eta_{fx}(x_{di}), \eta_{fy}(y_{dj}), \ldots)$ where $d \equiv (i, j, \ldots, k)$ is an n-tuple of integers labeling a vector of indices and runs from 1 to $D \equiv (I_d, J_d, \ldots, K_d)$. The square brackets distinguish the data point index from the subscripts "f" and "b". From the basis grid indices, one may complete the forward model by identifying the vector of shape function values $g_f = [g_{f[1]}, g_{f[2]}, \ldots g_{f[d]}, \ldots g_{f[D]}]$ with the corresponding values of the basis shape function $g_b = [g_{b[1]}, g_{b[2]}, \ldots g_{b[d]}, \ldots g_{b[D]}]$. Equation (5) also holds true in this case.

This ensures that all forward model functions will be similar in shape to the basis function. During the fitting process, $\eta_{fx}(x_{di}), \eta_{fy}(y_{dj}), \ldots$ will change from iteration to iteration for each d, so that the vector $g_f$ will also change. On the other hand, the underlying shape function $g_f(\eta_x, \eta_y, \ldots) \equiv g_b(\eta_x, \eta_y, \ldots)$ does not change.

In a further embodiment, the method of the present invention also applies to system functions which require different basis shape functions (i.e., basis shape functions with different numbers and configurations of saddle points, maxima, and minima) in different sub-domains. Here, fitting or conversion would apply different forward models to different sub-domains.

The present method also facilitates to capture the shape of an N-dimensional hypersurface by generalizing Equations (1) and (2) to the case of N-similarity variables. Manipulating the model parameters in the N-dimensional generalization of Equation (3) would produce a class of surfaces that were similar. This approach may be useful in visualization and graphics applications, in studies of functional similarity, and in comparisons of coincident data or model results.

The present invention is a novel method of incorporating the knowledge of generic system function shape properties into fitting functions or forward models for data inversion. Further, the present invention also represents a unique way for manipulating a class of system functions for use in data visualization, display, or synthesis. For given data sets or detailed numerical simulations describing an engineering or physical system, the present invention represents (i) a new method of determining generic system function shape properties, (ii) provides a new, efficient method of embedding generic properties into fitting function or a parameterized representation of a class of functions for data and system visualization. Also, for any system variables on which data or numerical simulations are available, the present invention provides a fitting function or forward model with optimal robustness (flexibility) for smoothing or inverting noisy data with optimal (i.e., neither too much nor too little flexibility and neither too many nor too few model parameters) numbers of parameters to be determined from inversion or fitting calculations in the presence of noise. The present invention achieves optimal computational complexity due to the optimal robustness.

Although various embodiments of the present invention are discussed with applications to geophysical functions, such discussion should only be considered as exemplary. It will be understood that the present invention equally applies to the parameteric representation of any real-world function, including engineering functions or physical functions.

It is believed that the operation and construction of the present invention will be apparent from the foregoing Detailed Description. While the apparatus and method shown and described have been characterized as being preferred, it should be readily understood that various changes, modifications and enhancements could be made therein without departing from the scope of the present invention as set forth in the following claims.

Accordingly, those skilled in the art should readily appreciate that these and other variations, additions, modifications, enhancements, et cetera, are deemed to be within the ambit of the present invention whose scope is determined solely by the following claims as properly interpreted in accordance with the doctrine of equivalents.

PATENT APPLICATION
NAVY CASE: 82482

Appendix I

PATENT APPLICATION
NAVY CASE: 82482

Similarity Transformations for Fitting of Geophysical Properties:

Application to Altitude Profiles of Upper Atmospheric Species

J. M. Picone and R. R. Meier

E. O. Hulburt Center for Space Research

Naval Research Laboratory

Washington, DC 20375

Revised Version Submitted to

Journal of Geophysical Research

February 1, 2000

PATENT APPLICATION
NAVY CASE.: 82482

Abstract

The similarity transform method provides a new, highly robust, and stable parametric representation of geophysical functions for use in retrieving such functions from remote sensing observations. The present discussion focuses on the approximation of altitude profiles of upper atmospheric species concentration and on the development of parametric forward models for use with discrete inverse theory (DIT). Of equal importance, the similarity transform approach provides a framework for extracting generic profile shape information, in the form of a nondimensional shape function, from observations or detailed numerical simulations. In this way, the method facilitates analysis of general characteristics of species concentration variations with altitude and with other geophysical parameters. For DIT retrievals of concentration profiles from observations, a similarity transformation-based forward model embeds the generic ("basis") shape information directly into a parametric representation of each species profile. The presentation covers the extraction of nondimensional shape functions from discrete data or simulations, the basic forward model representation, and generalizations of the basic approach. We include simple examples of similarity transform fitting calculations in which the species concentration profiles to be approximated are generated by the MSISE-90 empirical atmospheric model, as are the basis profiles which define the shape information.

PATENT APPLICATION
NAVY CASE: 82482

1. Introduction 1.1 Background

Upper atmospheric remote sensing techniques often measure geophysical properties indirectly, requiring that the underlying variable of interest (e.g., species density) be inferred from the data through comparison with a forward model of the measurement process. In discrete inverse theory (DIT) (e.g., Menke [1989]; Picone et al. [1997]), the forward model includes a parametric representation of the variable to be retrieved; the data then provide the basis for computing optimal values of the model parameters. Herein we describe a new, highly robust, stable parametric representation of the function to be retrieved. Although this paper deals with a specific application, the methodology is potentially applicable to a wide range of physical and mathematical problems.

Consider the remote measurement of altitude profiles of upper atmospheric properties (e. g., species densities or temperature). Two specific examples are computerized ionospheric tomography (e.g., Fremouw et al., [1992]) and remote sensing of thermospheric and ionospheric composition via ultraviolet limb-scanning or limb-imaging [Meier and Picone, 1994; Picone et al., 1997]. In the inversion process, one may parameterize the species altitude profile by one of several means, for example: (1) using an analytic function, (2) specifying model parameters to be the actual species concentration values on an altitude grid, or (3) expanding the profile in a set of basis functions (e.g., splines or empirical orthogonal functions), which is often truncated to increase computational speed. The first alternative, an analytic function, constrains the forward model sufficiently to prevent undue influence by noise and often requires a minimal number of model parameters to be evaluated. On the other hand, an analytic function will probably lack the robustness to capture all of the possible atmospheric states. The second method, and often the third, will require the evaluation of more model parameters. In addition, some form of regularization or a priori information is necessary to ensure smoothness of the retrieved density profile in the presence of noise; otherwise these alternatives can be sufficiently flexible to "fit the noise" or to become computationally unstable. In some instances, (e.g., Bernhardt et al. [1998]), combining different types of coincident data might preclude the need for regularization. That topic is outside the scope of the present discussion.

The alternative offered here embeds detailed information on the shape of the species altitude profile in a discrete (grid-based) profile representation. Standard interpolation (e.g., quadratic or spline interpolation) converts this to a continuous parametric representation. This approach has many of the advantages of the analytic function approach without the drawback of having to identify or concoct an analytic representation that is both physically faithful and sufficiently robust. Potential sources of the detailed shape information include past discrete data on composition versus altitude (e.g., incoherent scatter radar measurements of electron or $O^+$ density or temperature) or profiles derived from detailed numerical simulations [Meier et al., 2000]. Further, this "similarity transform" method enables us to study the universality of species profile shapes in various models or data sets as functions of geophysical conditions (e.g., solar or geomagnetic activity), location, time, and day of year, and should provide a useful tool in the analysis of atmospheric, properties or even in database synthesis or compression.

PATENT APPLICATION
NAVY CASE: 82482

1.2. Approach

This paper deals specifically with developing optimal parametric approximations of geophysical functions underlying data. These approximations are vital for constructing "forward models" of measurement processes. We adopt the simple, practical point of view that the forward model ideally provides a parameterized representation of the "true" signal which would be measured if statistical noise were not present, either in the a priori inputs to the forward model or in the measuring process [Picone et al., 1997]. Our key criterion of performance, therefore, is how closely the similarity transform method can approximate, or fit, exact or noiseless functions. As a result, the tests presented herein involve direct fitting of similarity transform-based parametric functions to species density profiles derived from the MSISE-90 empirical model, i.e., without adding statistical noise to the profiles.

This approach contrasts with discrete inverse theory (DIT) testing, which usually simulates the extraction of information from data that contain both statistical noise and systematic errors induced by the observing system [Picone et al., 1997]. On the other hand, the key application of the similarity transform method is to the construction of forward models for DIT, and, furthermore, we compute our measures of merit using nonlinear least squares fitting with uniform weights, a limiting-case DIT method. As a result, our discussion uses DIT terminology. The Appendix briefly outlines relevant DIT notation and techniques.

Although the similarity transform method is simple, the authors' experience in implementing the method has shown that all of the details must be explicitly laid out for a new user to apply the method successfully. For this reason, the description below

PATENT APPLICATION
NAVY CASE: 82482 is as precise as possible. While this has made the paper somewhat less readable, programming the equations with careful attention to the subscripts and to the supporting text should produce optimally robust, smooth, parametric numerical approximations to physical functions.

The next section describes the use of shape information to construct a parameterized fitting function or forward model and defines the basic, one-dimensional method for extracting shape information from discrete observations or from numerically generated profiles. Following this is a comprehensive description of the simplest similarity transform profile parameterization for use in retrieving information from remote sensing data, along with an example in which this approach is used to fit thermospheric composition profiles from the MSISE-90 model [Hedin, 1991]. Section 3 generalizes the retrieval method to permit segmentation of the shape function for optimal mapping of the parameterized forward model profile to specific segments of the exact profile underlying data. Application of the generalized method to the example of Section 2 provides the user with a test problem for exploring potential advantages of segmented fitting. The final section concludes with a discussion of multidimensional shape functions and suggests more general applications of this approach.

2. Extracting and Applying Shape Information

2.1. Function Approximation Using the Similarity Transformation Method

The central topics of this paper are twofold: (1) the approximation of a given geophysical function based on general, discrete information about its shape and (2) the development of parameterized representations which span the space of possible realizations of that function. For example, given a species number density profile that is known or assumed to be typical, the similarity transformation method will produce a parametric function that ranges over the infinite set of profiles having the same generic shape properties (ordering of local extrema, inflection points, etc.). This explicit shape constraint ensures smoothness in fitting noisy data by the parameterized function. In fact, by manipulating parameters related to altitude (next subsection), the DIT fitting process can automatically choose to map only a portion of the characteristic shape function to the given data vector.

2.1.1. Definitions of Shape Function, Similarity Variable, and Fitting Function First consider a continuous function $N(z)$, describing the variation of an atmospheric property (e.g., species density or its logarithm) with altitude $z$, over a domain $[z_0, z_M]$. To date, $N(z)$ has been monotonic in the cases that we have studied; in general, the methods of Section 3 can ensure piecewise monotonicity in a given forward model. Now define a dimensionless similarity variable $$\eta(z) \equiv \frac{z - z_0}{z_M - z_0} \qquad (1)$$

and a dimensionless profile shape function $$g(\eta(z)) \equiv \frac{N(z) - N_0}{N_M - N_0} \quad , \qquad (2)$$

where $N_0 \equiv N(z_0)$ and $N_M \equiv N(z_M)$ and $N_0 \neq N_M$. Notice that $\eta$ varies from 0 to 1, linearly with $z$, and that $g(0) = 0$ and $g(1) = 1$. Equations (1) and (2) then allow us to express the function $N(z)$ in terms of the similarity variable and shape function:

$$N(z, m) \equiv N_0 + g(\eta(z))[N_M - N_0] \quad , \qquad (3)$$

PATENT APPLICATION
NAVY CASE: 82482 where the model parameter vector $\mathbf{m} \equiv [z_0, z_M, N_0, N_M]$ is included to point out the dependence of N, η, and g on the parameters $z_0$, $z_M$, $N_0$, and $N_M$.

The similarity transformation representation uses the functional form of Equation (3), along with a shape function g(η) that is independent of the components of m. In addition g(η) must have the characteristics identified above – a domain η ∈ [0, 1] and boundary values g(0) = 0 and g(1) = 1. For a given shape function g(η), Equations (1) and (3) provide us with an infinite set of functions N for any altitude in a (variable) domain $[z_0, z_M]$ as the components of m vary over all possible values. We call the transformation represented by varying m a "similarity transformation," consistent with Sedov [1959], since the transformation maintains the non-dimensional shape characteristics defined by g(η). In order for Equations (1) and (3) to approximate a particular class of geophysical functions, e.g., thermospheric $N_2$ concentration profiles, the shape function must, of course, be appropriate. To derive an approximate form for g(η), we can use any available experimental data, numerical simulations, or theoretical studies.

2.1.2. Deriving an Approximation to the Shape Function

Assume that our information on the specified atmospheric property (e.g., species density or its logarithm) takes the form of a measured or simulated discrete profile of values $\{N(z_i); i = 0, 1, ..., M\}$ on a monotonically increasing discrete grid $\{z_i ; i = 0, 1, ..., M\}$, so that $z_0 < z_1 < ... < z_M$. This gives us a particular model parameter vector $\mathbf{m}_b$, as defined above. The subscript "b" signifies correspondence to the profile that is used as the "basis" for defining the shape function in Equation (3). Substituting the values of $z_i$, $N(z_i)$, and $\mathbf{m}_b$ into Equations (1) and (2) gives us discrete values of the

PATENT APPLICATION
NAVY CASE: 82482 underlying shape function, $g(\eta_i) \equiv g(\eta(z_i, \mathbf{m}_b))$. By the definition of the parameterized fitting function in Equation (3), the shape function $g(\eta)$ used therein is specified to be independent of $\mathbf{m}$, even though we generated values of $g$ from the specific profile corresponding to $\mathbf{m}_b$. To obtain a continuous function $g(\eta)$, one interpolates over the discrete set of values $\{\eta_i, g(\eta_i)\}$. We reiterate that the values of $\eta(z)$ and $N(z)$ in our forward model or fitting function depend on $\mathbf{m}$ through Equations (1) and (3).

Figure 1 shows an example derived from an MSISE-90 calculation of the atomic oxygen number density, $[O](z)$, covering several decades (Figure 1a). In this example, $N(z)$ is $\log [O](z)$, where "log" denotes the natural logarithm. Notice in Figures 1b and 1d that both $\eta$ and $g$ vary from 0 to 1 as $z$ varies from the lowest to the highest grid points defining the altitude profile. Figure 1c further reveals a linear relationship between the shape function and the corresponding logarithmic density profile, consistent with Equation (2). The shape function therefore captures the manner in which the atmospheric property varies over its domain, independent of the actual range of physical values or the size of the domain. This nondimensionalization places all profiles in the domain $[z_0, z_M]$ on a more equal footing and, for example, permits a direct comparison of profiles of a given property under different conditions or at different locations. To obtain values of the geophysical property at an altitude $z$, where $z \notin \{z_i\}$ but $z_0 \leq z \leq z_M$, one must interpolate. This limits the accuracy of profile retrievals from data, but so far the limitation has proven to be inconsequential.

Clearly this method does not apply to the trivial case of $N(z) = $ constant or to non-monotonic profiles with $N_0 = N_M$. For profiles which are non-monotonic, but whose domains can be divided straightforwardly into monotonic regions or into regions

[$z_B(k)$, $z_T(k)$] ($k^{th}$ region, $z_B(k) < z_T(k)$) for which $N(z_B(k)) \neq N(z_T(k))$, one may apply the similarity transform method separately to each region, with contiguous regions sharing model parameters at their common boundaries. In the case of $O^+$ in the ionospheric F-region, for example, one could define separate shape functions and similarity variables in the bottomside and the topside regions, setting $N(z_T(\text{bottomside})) = N(z_B(\text{topside})) = Nmf2$ and $z_T(\text{bottomside}) = z_B(\text{topside}) = hmf2$ for fitting or DIT applications.

2.2. Application to Retrieval of Species Profiles From Data

As indicated earlier, our discussion adopts the terminology of DIT [Menke, 1989]. By convention, the subscripts "b," "d," and "f" will signify the basis profile, the true profile underlying the data (i.e., the exact profile), and the forward model, respectively. When one fits a smooth profile directly to noisy data, the terms "forward model" and "fitting function" are equivalent. First select a "basis" profile, with a shape function $g_b$ that is expected to provide an acceptable fit to the shape function $g_d$ of the exact profile $N_d$. Studies of detailed numerical simulations or of direct observations can provide information on the specific basis shape function(s) or basis profiles that would be appropriate, or the user can bravely assert that a specific sample profile is adequate and then can test the assertion by application to actual data or numerical simulations. In practical situations, the basis profile consists of discrete values $N_b(z_{bi})$, defined at $M'+1$ points $\mathbf{Z}_b \equiv \{z_{bi}, i = 0, 1, ..., M'\}$. The procedure of Section 2.1.2 then provides the basis shape function values $\{g_b(\eta_b(z_{bi}))\}$, where $\eta_b(z_{b0}) = 0$ and $\eta_b(z_{bM'}) = 1$. As noted in the previous section, this table $\{\eta_{bi}, g_b(\eta_{bi})\}$ of basis shape function values does not change once the values are computed from a basis profile. The constancy of this table constrains the shape of the parameterized functions in Equation (3) as the model parameters vary during a fitting calculation or DIT procedure. Obtaining values $g_b(\eta_b(z))$ for $z \notin Z_b$ with $z_{b0} < z < z_{bM'}$ requires interpolation within the set $Z_b$; quadratic and spline interpolation have shown good performance in our tests. Equivalently, obtaining values of $g_b$ at other values of $\eta$ requires interpolation over the set $\{\eta_b(z_{bi})\}$. On the other hand, extrapolation outside of the basis function domain is arbitrary and therefore is not optimal; the use of constraints on forward model parameters (e.g., $z_{fB}$ and $z_{fT}$, defined below) during inversion calculations can prevent extrapolation. In our applications, proper initialization of the model parameters has been sufficient to prevent extrapolation outside the domain $\eta \in [0, 1]$ (Section 2.3.2).

Given the basis shape function, Equations (1) and (3) also define a forward model $N_f$ for $N_d(z_{di})$, the exact profile of the property of interest which underlies the data. To fit direct observations of $N(z)$, one evaluates the forward model at the data grid points $\{z_{di}; i = 1, 2, ..., M\}$. For indirect observations (e.g., Picone et al. [1997]), the user selects points at which the forward model is to be evaluated. The model parameter vector, to be evaluated from the data by DIT, is $\mathbf{m} \equiv [z_{fB}, z_{fT}, N_{fB}, N_{fT}]$, where "B" and "T" signify "bottom" and "top", so that $z_{fB} \leq z_{di} < z_{dM} \leq z_{fT}$, $N_{fB} \equiv N_f(z_{fB})$, and $N_{fT} \equiv N_f(z_{fT})$. Likewise, the forward model similarity variable corresponding to the point, $z_{di}$, is $$\eta_f(z_{di}) \equiv \frac{z_{di} - z_{fB}}{z_{fT} - z_{fB}} , \qquad (4)$$

and the forward model value for the retrieved property at that location is $$N_f(z_{di}) \equiv N_{fB} + g_f(\eta_f(z_{di}))[N_{fT} - N_{fB}] . \qquad (5)$$

Defining $g_{f[i]} \equiv g_f(\eta_f(z_{di}))$ and $g_{b[i]} \equiv g_b(\eta_f(z_{di}))$, where the square brackets distinguish the data point index from the subscripts "f" and "b" and from the basis grid indices, one may complete the forward model by identifying the vector of shape function values $g_f \equiv [g_{f[1]}, g_{f[2]}, ..., g_{f[i]}, ..., g_{f[M]}]$ with the corresponding values of the basis shape function $g_b \equiv [g_{b[1]}, g_{b[2]}, ..., g_{b[i]}, ..., g_{b[M]}]$, i.e., $$g_f \equiv g_b . \qquad (6)$$

This ensures that all forward model profiles will be similar in shape to the basis profile. During the fitting process, $\eta_f(z_{di})$ will change from iteration to iteration for each i, so that the vector $g_f$ will also change. On the other hand, the underlying shape function $g_f(\eta) \equiv g_b(\eta)$ does not change. In the terminology of Section 3, Equations (4)-(6) define an "L=1" forward model, where L is the number of contiguous segments of g that are being mapped to the data.

Equations (4) and (5) show that manipulating m allows us to shift the basis profile to higher or lower values of $N_f$ and to stretch or compress the basis profile, thereby mapping a portion of the basis profile to the exact profile $N_d(z_{di})$. Note that compression can be dangerous, forcing the fitting code to extrapolate the basis shape function beyond the domain on which $g_b$ is defined, i.e., to $\eta_f$ outside of the interval [0,1]. As indicated earlier, the transformation represented by varying m is a similarity transformation, consistent with Sedov [1959], since the transformation maintains the non-dimensional shape characteristics embedded in $g_b(\eta)$.

2.3. An Example

To demonstrate the retrieval process and to permit potential users to test the similarity transformation method of function approximation directly, we have chosen a simple, nontrivial example. As indicated in the introduction, the proper performance criterion is how closely the similarity transform representation can fit an exact (noiseless) geophysical function. From the standpoint of convergence, this is also the most stringent criterion, since we have found that a nonlinear fitting process is generally more likely to converge properly in the presence of noise.

In this example, the exact profiles are MSISE-90 profiles of neutral species number density ($[N_2]_d$, $[O]_d$, $[O_2]_d$), evaluated at altitudes $z_{di}$ in the interval [120, 450] km. The specific thermospheric conditions correspond to latitude 67.5° and longitude 220° during a major geomagnetic storm: year 1982, day 195, local time 0900 hr, Ap = 153, $F_{10.7}$ = 260, and 81-day average $\langle F_{10.7} \rangle$ = 168. Note that 3-hr ap inputs were used in MSISE-90 and that the Ap value is given only for perspective on this extremely active day. Fitting the natural logarithm of the data, $\{N_{sd}(z_{di}) = \log([x_s]_d(z_{di})); s = 1, 2, 3; x_1=N_2, x_2= O_2, x_3= O$ ; i = 1, 2, ..., M$\}$, provided the best results.

To compute fits of the similarity transform model (next section) to the exact profiles, the Levenberg-Marquardt procedure [Press, et al., 1992] is our method of choice (see Appendix). Since the exact profiles do not include noise, we set the covariance, [cov $\mathbf{d}^o$], to the identity matrix. Then $\chi^2$ is the sum over species of the squared residuals at the altitude grid points, and the procedure reduces to <u>nonlinear</u> least squares fitting with uniform weights.

2.3.1. Basis and forward model shape functions

For the basis profile, use the same thermospheric conditions, but specify different latitude and longitude: $-2.5°$ and 140°, respectively. Select a basis grid with $z_{bi}$ in the interval $[z_{b0}, z_{bM'}] = [102, 923]$ km, where the number of points is M'+1 = 26. Figure 1 shows the basis values for atomic oxygen under these conditions. Given the log values of the basis density profile for each species "s" at the basis grid points, i.e., $\{N_{sb}(z_{bj}) \equiv \log([x_s]_b(z_{bj})); s = 1, 2, 3; j = 0, 1, ...,$

PATENT APPLICATION
NAVY CASE: 82482

M'}, use Equations (1) and (2) to generate separate shape functions $\{g_{sb}(\eta_b(z_{bj}));$ s, j ranging} for the three species.

Then, at each iteration of the fitting process, evaluate the similarity variable $\eta_{sf}(z_{di})$ for each species s using Equation (4) at each data grid point $z_{di}$, and interpolate the species basis shape function to $\eta_{sf}(z_{di})$ to obtain $g_{sb[i]} = g_{sb}(\eta_{sf}(z_{di}))$. Setting the vectors of forward model shape function values to the basis values, $g_{sf} = g_{sb}$, as in Equation (6), use Equation (5) to compute separate forward model values for each species on the data grid, $\{z_{di}\}$.

2.3.2. Initialization of the model parameter vector

The model parameter vector is $\mathbf{m} = [z_{fB}(N_2), z_{fT}(N_2), z_{fB}(O_2), z_{fT}(O_2), z_{fB}(O), z_{fT}(O), \log[N_2]_{fB}, \log[N_2]_{fT}, \log[O_2]_{fB}, \log[O_2]_{fT}, \log[O]_{fB}, \log[O]_{fT}]$. Denote initial model parameter values by superscript "0" and choose the component values of $\mathbf{m}^0$ to be identical with the basis values, i.e., $z_{fB}^0(N_2) = z_{b0}$, $z_{fT}^0(N_2) = z_{bM'}$, etc. For every species $x_s$, this ensures that $z_{fB}^0(x_s) < z_{d1}$ and $z_{fT}^0(x_s) > z_{dM}$ and that $\eta_{sf}^0(z_{di}) \in [0,1]$ for every data grid point $z_{di}$. Thus the data grid falls entirely within the forward model altitude domain, a situation which should be maintained during the fitting or inversion process. Failure to do so for a given species $x_s$ would result in up to two non-null subsequences, $\alpha_L$ and $\alpha_U$, of the data grid indices, such that the subset of $\eta_{sf}$-coordinate values would be outside of the unit interval, i.e., $\{\eta_f(z_{di}); i \in \alpha_L \cup \alpha_U\} \not\subset [0,1]$, causing extrapolation of the shape function. On these subsets, the information embedded in $g_b$ would not be entirely useful, and the overall inversion results would be unpredictable. Fortunately, when the forward model was properly initialized, as indicated above, extrapolation did not occur in our tests. For our tests, the initial model parameter vector was $m^0$ = [102, 923, 102, 923, 102, 923, 29.7, 5.70, 28.2, 0.554, 26.9, 13.1].

2.4. Results

Upon completion of the Levenberg-Marquardt fitting procedure, the resulting model parameter vector was $m$ = [96.6, 1017, 92.2, 1083, 96.6, 1094, 29.9, 6.59, 29.5, 0.975, 26.5, 11.2]. The top panels of Figure 2 show the species density fits to the respective exact profiles and the bottom panels show their ratios – the residuals are ~ 4.5% or less. This result is remarkably good, even though high latitude profiles during extremely active conditions were chosen as the exact profiles to be fitted. In fact, the basis and exact profiles differed by approximately a factor of three over a wide altitude range. In spite of this, our result verifies that the generic shape characteristics of the two profiles are quite similar, as one would expect, since the MSIS profile is defined analytically. This aspect of the similarity transform technique is important in its own right, as the method facilitates studies of the approximate universality of profiles derived either from data or from detailed numerical simulations [Meier et al., 2000].

As a point of comparison, Figure 3 shows a fit to the exact profile using the method of Meier and Picone [1994], in which the MSISE-90 basis profile above is modified by scaling of input and output arguments ("external" parameters). The scale factors are the

PATENT APPLICATION
NAVY CASE: 82482

DIT model parameters. Specifically, the method manipulates the scale height of the profile by scaling the input $F_{10.7}$ and $\langle F_{10.7} \rangle$ values, which are held equal and scaled by the same factor, as in the tests by Meier and Picone [1994]. Three additional altitude-independent factors scale the output density values of the respective species, shifting each altitude profile uniformly toward higher or lower values. In essence then, this alternative method seeks to stretch and scale the basis MSISE-90 profile, as the similarity transform method does. However, the method does this indirectly by scaling external parameters, rather than by directly manipulating the density profile itself. The model parameter vector is $\mathbf{m} = [f_{F10}, f_{N2}, f_{O2}, f_{O}]$; the initial value was $\mathbf{m}^0 = [1, 1, 1, 1]$; and the final value was $\mathbf{m} = [1.18, 0.731, 1.60, 3.21]$.

In comparison to Figure 2, the lower panels of Figure 3 cover a much wider range of values for the ratio of the computed density profile to the exact profile. The figure shows that the fits are much worse than for the similarity transform, and as a result, one might conclude that the MSIS profile shapes are so different at the basis and data locations as to preclude an accurate fit. However, the results of the similarity transform method do not bear this interpretation out. Rather, the "external" manipulation of the MSIS profiles through scaling of subroutine arguments does not permit sufficient flexibility in stretching and scaling the basis species profiles to derive an accurate fit to a wide range of observed or exact profiles.

3. Generalization of the Fitting Method

3.1. Alternative Strategies

One can generalize the fitting method of Section 2 by piecewise fitting of the basis shape function to contiguous subsets of the data vector. This permits

PATENT APPLICATION
NAVY CASE: 82482 the definition of separate, but connected, forward models for the contiguous data subsets, with each forward model stretching or shifting a portion of the basis shape function to achieve an optimal fit to the respective subset. Figure 4 depicts the mapping of one segment of the basis shape function, excluding the endpoint at $\eta_{bk}$ (middle panel), *onto* the semi-open subinterval $[z_{k-1}, z_k)$ within the overall domain $[z_B, z_T]$ of the forward model. The adjacent segments of the shape function, shown by dashed lines, map in the same way *onto* corresponding (dashed) subintervals of the forward model domain. the DIT calculation determines the optimal locations of the subinterval boundary points.

At least three methods of implementation are available:

(1) Split the basis function $g_b$ into an ordered set of L elements, consisting of contiguous sections that are held <u>fixed</u> during the DIT process; this involves partitioning the domain of $g_b$ (i.e., $\eta_b \in [0,1]$) into an ordered set of L contiguous subintervals. Likewise, partition the forward model altitude interval $[z_{fB}, z_{fT}]$ (or equivalently, partition the $\eta_f$-interval $[0,1]$) into the same number (L) of subintervals, whose boundary locations $\{\eta_{fk}\}$ and function values $\{N(\eta_{fk})\}$ serve as additional model parameters to be optimized by the DIT process. To data points falling in a given subinterval of the forward model domain, apply the method of Section 2, using the corresponding segment of $g_b$ to define the forward model (remember that $g_f \equiv g_b$), as in Equations (5) and (6). This requires remapping of $g_b$, $\eta_b$, and $\eta_f$

PATENT APPLICATION
NAVY CASE.: 82482 in each of the respective subintervals to the unit interval [0, 1] (see below). The third panel of Figure 4 depicts the remapped segment of $g_b$, denoted $\gamma$, as a function of the remapped similarity variable $\zeta$.

(2) Do the "opposite" of (1): as in (1), partition the basis function domain and the forward model domain into ordered sets of L contiguous pieces or subintervals; remap the subinterval g and $\eta$ functions as in (1). However, hold the boundary locations of the forward model domain subintervals fixed while treating the basis segment end-point locations $\{\eta_{bk}\}$ as model parameters to be varied. The values of the forward model $\{N(\eta_{fk})\}$ remain as model parameters.

(3) Combine (1) and (2) by treating both the segment end point locations $\{\eta_{bk}\}$ of the basis function domain and the corresponding segment end point locations $\{\eta_{fk}\}$ of the forward model domain as model parameters, along with $\{N(\eta_{fk})\}$.

Alternative (1) is the most straightforward and in practical terms, is equivalent to (2). While alternative (3) increases the number of model parameters and is potentially more robust, the gain should be small in comparison to the added computational cost. We have selected generalization (1) for detailed discussion.

PATENT APPLICATION
NAVY CASE: 82482

3.2. Outline and Equations for Alternative (1)

3.2.1. Subinterval Shape Function and Similarity Variable

One must first select the basis profile $N(z_{bi})$, defined at each point $z_{bi}$ of the set $Z_b$ (Section 2.2). The respective values of the basis similarity variable $\eta_b(z_{bi})$ and the shape function $g_b(\eta_b(z_{bi}))$ then derive from application of Equations (1) and (2) to the basis profile and to $Z_b$. Working in $\eta_b$-space, select an ordered set $\eta_b \equiv \{\eta_{bk} \in (0,1),\ k = 1, 2, ..., L\text{-}1;\ \eta_{b1} < \eta_{b2} < ... < \eta_{b(k-1)} < \eta_{bk} < ... < \eta_{b(L-1)}\}$ to define a fixed partition $P_b$ of the basis domain, consisting of L subintervals, $[0, \eta_{b1})$, $[\eta_{b1}, \eta_{b2})$, ..., $[\eta_{b(k-1)}, \eta_{bk})$, ..., $[\eta_{b(L-1)}, 1]$, of which all but one are semi-open. Also, for consistency of notation, define $\eta_{b0} \equiv 0$ and $\eta_{bL} \equiv 1$. The partition $P_b$ is arbitrary, but the user can select the subinterval boundaries by recognizing a lack of knowledge or, for the adventurous user, by using either intuition or knowledge. In the first instance (lack of knowledge), for example, one can set $\eta_{bk} = k/L$. In tests performed for L=2 (Section 3.3), results were equivalent across a set of reasonable alternatives for $P_b$. Note that the subinterval endpoints need not coincide with any points of the basis profile grid $Z_b$.

Now define a shape function and similarity variable for each basis subinterval separately; for example, consider the $k^{th}$ subinterval of $P_b$, i.e., $[\eta_{b(k-1)}, \eta_{bk})$. For $\eta \in [\eta_{b(k-1)}, \eta_{bk})$ define the subinterval similarity variable to be $$\zeta_{bk}(\eta) = \frac{\eta - \eta_{b(k-1)}}{\eta_{bk} - \eta_{b(k-1)}}, \qquad (7)$$

PATENT APPLICATION
NAVY CASE.: 82482 where $0 \leq \zeta_{bk} < 1$. Based on Equation (7), one may interpret $\zeta_{bk}$ as a generalized similarity variable that maps $[\eta_{b(k-1)}, \eta_{bk}]$, onto the unit interval $[0,1]$. For each basis grid point $z_{bi}$ such that $\eta_b(z_{bi}) \in [\eta_{b(k-1)}, \eta_{bk})$, $\zeta_{bk}(\eta_b(z_{bi}))$ gives the fractional location of $\eta_b(z_{bi})$ within the interval. In the same fashion, for the same subset of grid points one can define the subinterval basis shape function to be $$\gamma_{bk}(\eta_b(z_{bi})) = \frac{g_b(\eta_b(z_{bi})) - g_b(\eta_{b(k-1)})}{g_b(\eta_{bk}) - g_b(\eta_{b(k-1)})} \qquad (8)$$

where $0 \leq \gamma_{bk} \leq 1$ if $g_b(\eta)$ is monotonic over the $k^{th}$ subinterval. For each subinterval k, the set of pairs $\{[\zeta_{bk}(\eta_b(z_{bi})), \gamma_{bk}(\eta_b(z_{bi}))]; i \ni \eta_b(z_{bi}) \in [\eta_{b(k-1)}, \eta_{bk})\}$ – along with an interpolation algorithm – then specifies the subinterval basis shape function, $\gamma_{bk}(\zeta)$. Here the symbol "$\ni$" signifies a condition on the index "i". The subinterval basis shape function then defines a forward model on the $k^{th}$ subinterval, similar to Section 2. One can also express $\zeta$ and $\gamma$ in terms of z and N through application of Equations (1) and (2) for $\eta_b$, $g_b$ to Equations (7) and (8).

3.2.2. Subinterval Forward Model

Given the subinterval basis shape function, as extracted in Equation (8) from the basis shape function of Section 2, the definition of the forward model

PATENT APPLICATION
NAVY CASE: 82482 is straightforward. Similar to Section 3.2.1, define an ordered set of points, $\eta_f \equiv \{\eta_{fk} \in (0,1), k = 1, 2, ..., L-1; \eta_{f1} < \eta_{f2} < ... < \eta_{f(k-1)} < \eta_{fk} < ... < \eta_{f(L-1)}\}$, which in turn defines a partition $P_f$ consisting of L contiguous subintervals, $[0, \eta_{f1})$, $[\eta_{f1}, \eta_{f2})$, ..., $[\eta_{f(k-1)}, \eta_{fk})$, ..., $[\eta_{f(L-1)}, 1]$ of the closed unit interval. Note that, in general, $\eta_f$ and $\eta_b$ do not intersect, that is, $\eta_{fk} \neq \eta_{bk'}$, for every k, k'.

For each pair of indices (k-1, k), fit the data contained in the interval $[\eta_{f(k-1)}, \eta_{fk})$ using the subinterval basis shape function having index k, i. e., $\gamma_{bk}$, which corresponds to the basis subinterval $[\eta_{b(k-1)}, \eta_{bk})$. By treating the subinterval boundary values $\{\eta_{fk}\}$ as model parameters, the DIT process selects an optimal (discrete) mapping of the basis shape function onto the data within each subinterval of $P_f$. To the indices k = 1, 2, ..., L-1 of $P_f$ correspond values $\{N_{fk}\}$ of the forward model, which are also treated as model parameters to be evaluated from the data, along with the original model parameters $[z_{fB}, z_{fT}, N_{fB}, N_{fT}]$ and $\{\eta_{fk}\}$.

For each data grid point $z_{di}$, Equation (4) provides a value of $\eta_f(z_{di})$, for which one can determine the index k such that $\eta_f(z_{di}) \in [\eta_{f(k-1)}, \eta_{fk})$, i.e., subinterval k of $P_f$. The fractional location of $\eta_f(z_{di})$ within the interval is given by

PATENT APPLICATION
NAVY CASE.: 82482

$$\zeta_{fk}(\eta_f(z_{di})) = \frac{\eta_f(z_{di}) - \eta_{f(k-1)}}{\eta_{fk} - \eta_{f(k-1)}} \qquad . \qquad (9)$$

Once again, one may interpret $\zeta_{fk}$ as a generalized similarity variable that maps the interval $[\eta_{f(k-1)}, \eta_{fk}]$, onto the unit interval $[0,1]$. The forward model shape function on subinterval k is then $$\gamma_{f[i]} \equiv \gamma_{fk}(\eta_f(z_{di})) \equiv \gamma_{bk}(\zeta_{fk}(\eta_f(z_{di}))) \quad , \qquad (10)$$

where the square brackets distinguish the data point index from the indices (k-1) and k for the subinterval boundary points. As in Section 2 (Equation (6)), the subinterval basis shape function $\gamma_{bk}(\zeta)$ serves as the forward model shape function, and interpolation within the basis shape function grid is necessary to obtain the shape function values corresponding to the data grid, as specified by Equations (9) and (10). Then the forward model value $N_{f[i]}$ corresponding to the data point $N_d(z_{di})$ is $$N_{f[i]} \equiv N_{f(k-1)} + \gamma_{f[i]}(N_{fk} - N_{f(k-1)}) \qquad . \qquad (11)$$

The generalized shape function in Equation (8) then replaces the one which the method in Section 2 would provide on the subinterval $[\eta_{f(k-1)}, \eta_{fk})$.

3.3. Example

The example of Section 2 will serve to illustrate this generalization. Let L=2, splitting the basis and data profiles into two segments. Here we select the breakpoint in the

PATENT APPLICATION
NAVY CASE: 82482 basis domain to be $\eta_{b(L-1)} = \eta_{bl} = 0.118$, corresponding to the altitude $z_{bl} = 199$ km, and the <u>initial</u> values of the forward model subinterval boundary point and altitude, $\eta_{fl}$ and $z_{fl}$, are also 0.118 and 199 km. The initial value of $N_{fl}$ is the interpolated basis value $N_b(z_{fl})$. Noting that Equation (4) may be used to express the model parameter $\eta_{fl}$ in terms of the corresponding altitude $z_{fl}$, our model parameter vector is $\mathbf{m} = [z_{fB}(N_2), z_{fl}(N_2), z_{fT}(N_2), z_{fB}(O_2), z_{fl}(O_2), z_{fT}(O_2), z_{fB}(O), z_{fl}(O), z_{fT}(O), \log [N_2]_{fB}, \log [N_2]_{fl}, \log [N_2]_{fT}, \log [O_2]_{fB}, \log [O_2]_{fl}, \log [O_2]_{fT}, \log [O]_{fB}, \log [O]_{fl}, \log [O]_{fT}]$; the initial value is $\mathbf{m}^0 = [102, 199, 923, 102, 199, 923, 102, 199, 923, 29.7, 22.2, 5.70, 28.2, 19.4, 0.554, 26.9, 22.5, 13.1]$; and the final value was $\mathbf{m} = [97.9, 197, 1026, 94.9, 199, 1093, 92.7, 222, 1279, 29.8, 22.9, 6.27, 29.2, 20.8, 0.520, 26.8, 21.5, 9.63]$.

Figure 5 shows the resulting ratios of the optimal similarity transform profiles to the respective exact profiles. This shows noticeable relative improvement in percentage error, as compared to the already excellent fit for L=1 in Figure 2. On the other hand, the absolute improvement in the ratio of the fitted density to the exact density is small. This is no surprise, since the generic MSIS shape is defined analytically, so that segmentation of the MSIS-derived shape function should not provide a large absolute improvement. In our fits of MSIS-based similarity transform models to Thermosphere-Ionosphere-Electrodynamics General Circulation Model (TIE-GCM: Richmond et al., [1992]) profiles, differences between the basic (L=1) method and its L=2 generalization have been more dramatic.

PATENT APPLICATION
NAVY CASE.: 82482

4. Discussion

The similarity transform method provides a highly flexible and stable alternative to standard methods of approximating functions (e.g., splines, truncated expansions of empirical orthogonal functions, or discrete representations). In order to ensure smoothness of a species density profile retrieved from data in the presence of noise, or in order to maintain satisfactory convergence of a DIT or fitting calculation, such standard methods can require an explicit constraint, based on *a priori* information or based on a regularization technique, and can require explicit truncation of a basis set. The *a priori* information is often an educated guess as to what the specific fitting or inversion result will be and in some sense can be too specific to be optimal.

The key point is that standard methods, such as the three classes identified in the introduction, implicitly represent a lack of detailed knowledge of the profile shape and, in some sense, can give the user "too much" flexibility. Devising and implementing constraints to manage that flexibility is often an art rather than a science. The similarity transform method, on the other hand, is particularly appropriate when information *is* available on the profile shape. The method is systematic and provides the means to do the following: (1) to extract detailed, generic, discrete profile shape information from past data or from detailed numerical simulations and (2) to embed shape information in a parametric forward model for retrieval of the species concentration altitude profile. Ideally this optimizes both the robustness of the forward model and the number of parameters to be evaluated (computational complexity). The generalization of the fitting method, presented in Section 3, facilitates optimal piecewise mapping of the detailed shape information to contiguous subsets of the data.

PATENT APPLICATION
NAVY CASE.: 82482

The methodology for systematically deriving detailed, generic shape information from observations or from numerical simulations is itself a powerful scientific tool. For example, the extraction of shape information at every latitude-longitude grid point of a general circulation model field permits the study of variability and approximate universality of species profile shape under specific geophysical conditions [Meier et al., 2000]. Furthermore, one could capture the shape of an N-dimensional hypersurface by generalizing Equations (1) and (2) to the case of N similarity variables. Manipulating the model parameters in the N-dimensional generalization of Equation (4) would produce a class of surfaces which were similar, in the sense of Sedov [1959]. This is potentially useful in visualization and graphics applications, in studies of functional similarity, and in comparisons of coincident data or model results.

Appendix: Discrete Inverse Theory and Function Approximation

The similarity transformation method allows us to construct optimal fitting functions and other types of forward models for use in discrete inverse theory (DIT) [Menke, 1989; Picone et al., 1997]. Discrete inverse theory usually deals with the extraction of information from data which contain statistical noise and systematic errors induced by the observing instrument. The forward model is a key component of a DIT procedure, providing a parameterized representation of the "true" signal which would be measured if statistical noise were not present. Ideally, manipulation of the forward model parameter values permits the forward model to fit the true signal exactly. For this reason, our tests in Sections 2.3 and 3.3 involve the approximation of noiseless geophysical functions, in contrast to DIT testing, in which synthetic data must usually include statistical noise, as do actual data.

PATENT APPLICATION
NAVY CASE: 82482

To outline the relevant aspects of DIT, consider a set of discrete observational data which may be expressed as components of a vector $\mathbf{d}^o$ of length $N$ (the number of data points). A simple example of $\mathbf{d}^o$ would be an $O^+$ number density altitude profile, denoted $[O^+](z)$ and measured by an incoherent scatter radar at a discrete set of altitudes $\{z_{di}\}$. In order to extract a smooth $[O^+]$ profile, we require a "forward model," of the noiseless $O^+$ density versus altitude, denoted by $\mathbf{G}^{DIT}(\mathbf{m}) = \mathbf{d}^m$, where $\mathbf{m}$ is a vector of $M$ "model" parameters to be evaluated from the data. The vector $\mathbf{d}^m$ is the smooth model $[O^+]$ profile, evaluated at the altitudes corresponding to the observations. The vector function $\mathbf{G}^{DIT}$ thus maps the set of model parameters onto a smooth $[O^+]$ profile for comparison with the experimental values. If we were to represent $[O^+](z)$ as a simple, three-parameter ("constant scale height") Chapman-type profile in the altitude variable z, $$[O^+](z) = N_{max} \exp\left[\frac{1}{2}\left(1 - \frac{z - z_{max}}{H} - \exp\left\{-\frac{z - z_{max}}{H}\right\}\right)\right],$$

then $M = 3$ and $\mathbf{m} = [N_{max}, z_{max}, H]$, the vector of "Chapman parameters." Note that $z_{max}$ is the altitude at which the $O^+$ number density peaks or the "peak height," $N_{max}$ is the peak $O^+$ number density (i.e., $[O^+](z_{max})$), and H is the (neutral) atomic oxygen scale height. Evaluating the equation at $\{z_{di}\}$, the altitudes of the measurements, gives us $\mathbf{G}^{DIT}(\mathbf{m})$, which is nonlinear in $\mathbf{m}$. To compute an optimal value of $\mathbf{m}$, the DIT method systematically and rapidly searches the model parameter space spanned by the allowed values of $\mathbf{m}$ in order to minimize a generalized distance between $\mathbf{d}^o$ and $\mathbf{d}^m$.

Often $\chi^2 = \left(d^o - d^m\right)^T [cov\, d^o]^{-1} \left(d^o - d^m\right)$ serves as the generalized distance function, where $[cov\, d^o]$ is the covariance of the data.

An important point is that the above three-parameter forward model does not provide an accurate representation of all ionospheric topside [$O^+$] profiles [Picone et al., 1997], even though the profiles have shapes that are similar to Chapman-type profiles. In limited testing, we have found that application of the similarity transformation method can provide a far more robust profile and improved fits to incoherent scatter radar data, as compared to Chapman-type functions and to standard empirical models.

5. Acknowledgements

The authors acknowledge helpful discussions with D. P. Drob. The Office of Naval Research provided the support for this work.

References

Bernhardt, P. A., et al., Two-dimensional mapping of the plasma density in the upper atmosphere with computerized ionospheric tomography (CIT), *Physics of Plasmas*, 5(5), 2010-2021, 1998.

Fremouw, E. J., J. A. Secan, and B. M. Howe, Application of stochastic inverse theory to ionospheric tomography, *Radio Sci.*, 27(5), 721-732, 1992.

Hedin, A. E., Extension of the MSIS thermosphere model into the middle and lower atmosphere, *J. Geophys. Res.*, 96, 1159-1172, 1991.

Meier, R. R., and J. M. Picone, Retrieval of absolute thermospheric concentrations from the far UV Dayglow: an application of discrete inverse theory, *J. Geophys. Res., 99*, 6307-6320, 1994.

Meier, R. R., J. M. Picone, D. P. Drob, and R. G. Roble, Similarity analysis of TIE-GCM and MSIS composition profiles, *J. Geophys. Res.*, in preparation, 2000.

Menke, W., *Geophysical Data Analysis: Discrete Inverse Theory, Intl. Geophys. Ser., No. 45*, Academic, San Diego, 1989.

Picone, J. M., R. R. Meier, O. A. Kelley, D. J. Melendez-Alvira, K. F. Dymond, R. P. McCoy, and M. J. Buonsanto, Discrete inverse theory for 834 Å ionospheric remote sensing, *Rad. Sci., 32*, 1973-1984, 1997.

Press, W. H., S. A. Teukolsky, W. T. Vetterling, and B. P. Flannery, *Numerical Recipes: The Art of Scientific Computing*, Cambridge University Press, New York, 1992.

Richmond, A. D., E. D. Ridley, and R. G. Roble, A thermosphere/ionosphere general circulation model with coupled electrodynamics, *Geophys. Res. Lett., 19*, 601-4, 1992.

Sedov, L. I., *Similarity and Dimensional Methods in Mechanics*, trans. by M. Holt and M. Friedman, Academic Press, New York, 1959.

PATENT APPLICATION
NAVY CASE: 82482

Figure Captions

1. (a) Basis atomic oxygen number density, [O](z), vs. altitude. (b) Similarity variable, η(z), as a function of altitude. (c) Shape function, g(η(z)) vs. [O](z). (d) g(η(z)) vs. η.

2. Fits of L=1 similarity transformation forward model to MSISE-90 altitude profiles of $[N_2]$, $[O_2]$, and [O], respectively, left to right. Top panels show initial forward model profile (Δ), results (+), and exact profile (solid line). Bottom panels show respective ratios of the optimal fit to the exact profile vs. altitude; note that the plots cover ratios in the range 0.9-1.1.

3. Fits of MSIS-based forward model [Meier and Picone, 1994] to MSISE-90 altitude profiles of $[N_2]$, $[O_2]$, and [O], respectively, left to right. Top and bottom panels correspond to those in Figure 2. Note that the bottom panels cover ratios in the range 0.4-1.6, a much wider interval than in Figure 2.

4. Example of an L ≥ 3 forward model. The $k^{th}$ segment of the shape function, as defined by $\eta_{k-1}$ and $\eta_k$ (middle panel), maps to the $k^{th}$ subinterval of the data domain (left panel), as defined by the model parameters $z_{k-1}$ and $z_k$. To define a forward model for this subinterval, one normalizes the similarity variable and shape function over the domain [$\eta_{k-1}$, $\eta_k$), as shown in the right panel. The forward models for the neighboring subintervals couple to the $k^{th}$ subinterval forward model by sharing model parameters at the respective boundaries.

5. Fits of L=2 forward model to MSISE-90 altitude profiles of $[N_2]$, $[O_2]$, and $[O]$, respectively, left to right. Top and bottom panels correspond to those in Figure 2.

What is claimed is:

1. A method of extracting geophysical parameters representing geophysical functions for inversion of remote sensing data, said method comprising:
   a) obtaining samples of atmospheric profiles;
   b) extracting shape information from the sample profiles using a similarity transform;
   c) embedding the shape information in a parametric discrete grid-based profile representation model (forward model);
   d) performing processing to fit the forward model to sample profiles to obtain fitted forward model; and
   e) retrieving species concentration profiles from the fitted forward model.

2. The method of claim 1, wherein said profiles for extracting shape information are obtained by remote sensing systems.

3. The method of claim 1, wherein said profiles for extracting shape information are obtained by numerical simulations.

4. The method of claim 1, wherein said profiles for extracting shape information are obtained by analytic theory.

5. The method of claim 1, wherein said profile shape information is extracted at every latitude-longitude grid point for maintaining an approximate universality of species profile shape under specific geophysical conditions.

6. The method of claim 1, wherein said shape information is extracted using Discrete Inverse Theory (DIT).

7. The method of claim 1, wherein said forward model provides a parameterized representation of a signal without statistical noise (true signal).

8. The method of 1, wherein values of said forward model are manipulated to fit said forward model to said true signal.

9. The method of claim 1 is performed to accomplish at least one of function fitting, inversion of data, graphical display and data visualization, pattern recognition, or data synthesis functions.

10. A similarity transform method of extracting geophysical parameters representing geophysical functions for use in retrieving the geophysical functions by inversion of remote sensing data, comprising:
    a) obtaining function samples by using one or more of (i) remote measurements, (ii) numerical simulations, (iii) analytic models;
    b) extracting generic profile shape information from the samples using a similarity transform;
    c) embedding the profile shape information in a parametric discrete grid-based profile representation model (forward model);
    d) fitting the forward model to the samples to obtain fitted forward model; and
    e) retrieving species concentration profiles from the fitted forward model to retrieve geophysical functions.

11. A method of extracting parameterized representation of functions for use in retrieving the functions from measured data, said method comprising:
    a) obtaining samples of the functions;
    b) extracting shape information from the samples using a similarity transform;
    c) embedding the shape information in a parametric discrete grid-based profile representation model (forward model);
    d) performing processing to fit the forward model to data to obtain fitted data model; and
    e) retrieving the functions from the fitted data model.

12. An apparatus for extracting geophysical parameters representing geophysical functions for use in retrieving the geophysical functions for inversion of remote sensing data comprising:
    a) means for obtaining samples of the functions;
    b) means for extracting shape information from the samples using a similarity transform;
    c) means for embedding the shape information in a parametric discrete grid-based profile representation model (forward model);
    d) means for performing processing to fit the forward model to data to obtain fitted data model; and
    e) means for retrieving the functions from the fitted data model.

13. The apparatus of claim 12, wherein said profiles for extracting shape information are obtained by remote sensing systems.

14. The apparatus of claim 12, wherein said profiles for extracting shape information are obtained by numerical simulations.

15. The apparatus of claim 12, wherein said profiles for extracting shape information are obtained by analytic theory.

16. The apparatus of claim 12, wherein said profile shape information is extracted at every latitude-longitude grid point for maintaining an approximate universality of species profile shape under specific geophysical conditions.

17. The apparatus of claim 12, wherein said shape information is extracted using Discrete Inverse Theory (DIT).

18. The apparatus of claim 12, wherein said forward model provides a parameterized representation of a signal without statistical noise (true signal).

19. The apparatus of claim 12, wherein values of said forward model are manipulated to fit said forward model to said true signal.

20. The apparatus of claim 12, further comprises one or more of (a) means for performing function fitting, (b) means for inversion of data, (c) means for graphical display and data visualization, pattern recognition, or data synthesis functions.

* * * * *